(12) United States Patent
Ebata et al.

(10) Patent No.: US 9,064,338 B2
(45) Date of Patent: *Jun. 23, 2015

(54) STEREOSCOPIC IMAGE GENERATION METHOD AND STEREOSCOPIC IMAGE GENERATION SYSTEM

(75) Inventors: Masaru Ebata, Tokyo (JP); Yuichi Somiya, Tokyo (JP)

(73) Assignee: M. SOFT CO., LTD., Tokyo (JP)

( * ) Notice: Subject to any disclaimer, the term of this patent is extended or adjusted under 35 U.S.C. 154(b) by 507 days.

This patent is subject to a terminal disclaimer.

(21) Appl. No.: 13/287,482

(22) Filed: Nov. 2, 2011

(65) Prior Publication Data

US 2012/0268452 A1    Oct. 25, 2012

(30) Foreign Application Priority Data

Apr. 21, 2011   (JP) .................................. 2011-094711

(51) Int. Cl.
  *G06T 19/20*   (2011.01)
  *H04N 13/00*   (2006.01)
  *H04N 13/02*   (2006.01)
  (Continued)

(52) U.S. Cl.
  CPC .................. *G06T 19/20* (2013.01); *G06T 15/40* (2013.01); *G06T 7/0051* (2013.01); *G06T 2219/2004* (2013.01); *H04N 13/0018* (2013.01); *H04N 13/0022* (2013.01); *H04N 13/026* (2013.01)

(58) Field of Classification Search
  CPC ..... G06T 7/205; G06T 7/0051; G06T 7/0081; G06T 7/0028; G06T 15/00; G06T 15/205; G06T 2207/20228
  USPC .......................... 382/154, 285; 345/419, 581; 348/E13.001, E15.001, 46
  See application file for complete search history.

(56) References Cited

U.S. PATENT DOCUMENTS 8,200,011 B2 *  6/2012  Eaton et al. .................... 382/173
8,599,403 B2 * 12/2013  Redert et al. .................. 358/1.15
(Continued)

FOREIGN PATENT DOCUMENTS

JP   2002123842 A    4/2002

OTHER PUBLICATIONS

Kunter, Matthias, S. Knorr, A. Krutz, and T. Sikora, "Unsupervised object segmentation for 2D to 3D conversion", Proc. SPIE 7237, Stereoscopic Displays and Applications XX, 7237 1B, Feb. 18, 2009.*

(Continued)

*Primary Examiner* — William C Vaughn, Jr.
*Assistant Examiner* — Jerry Jean Baptiste
(74) *Attorney, Agent, or Firm* — Porzio, Bromberg & Newman, P.C.

(57) ABSTRACT

A stereoscopic image generation method and a stereoscopic image generation system that can generate, from an original image, a stereoscopic image that allows the viewer to perceive a natural stereoscopic effect are provided. The method includes a region setting step of setting a plurality of regions in an original image, a characteristic information acquisition step of acquiring characteristic information for each of pixels constituting the original image, a depth information generation step of generating depth information for each of the pixels for each of the plurality of regions on the basis of the characteristic information, and a stereoscopic image generation step of generating a stereoscopic image in which the positions of the pixels are changed on the basis of the pieces of depth information.

14 Claims, 20 Drawing Sheets

(51) Int. Cl.
*G06T 15/40* (2011.01)
*G06T 7/00* (2006.01)

(56) References Cited

U.S. PATENT DOCUMENTS

2007/0146232 A1* 6/2007 Redert et al. ............... 345/6
2008/0260288 A1* 10/2008 Redert ........................ 382/285

OTHER PUBLICATIONS

Elmqvist, Niklas, U. Assarsson, and P. Tsigas, Employing Dynamic Transparency for 3D Occlusion Management: Design Issues and Evaluation, C. Baranauskas et al. (Eds.): INTERACT 2007, LNCS 4662, Part I, pp. 532-545, 2007.*

Azzari, Lucio, F. Battisti, and A. Gotchev, "Comparative Analysis of Occlusion-Filling Techniques in Depth Image-Based Rendering for 3D Videos", ACM MoViD'10, Oct. 25, 2010, Firenze, Italy.*

Redert, Andre', E. Hendriks, and J. Biemond, "Synthesis of multi viewpoint images at non-intermediate positions", IEEE International Conference on Acoustics, Speech, and Signal Processing, ICASSP-97, vol. 4, pp. 2749-2752, 1997.*

R. P. Berretty and F. E. Ernst, "High-quality images from 2.5D video", Proceedings Eurographics, Granada, 2003, Short Note 124.*

Chang, Yu-Lin, C. Fang, L. Ding, S. Chen, and L. Chen, "Depth Map Generation for 2D-3D Conversion by Short-Term Motion Assisted Color Segmentation", 2007 IEEE International Conference on Multimedia and Expo, pp. 1958-1961, 2007.*

Cheng, Fang-Hsuan and Y. Liang, "Depth Map Generation Based on Scene Categories", Journal of Electronic Imaging, vol. 18(4), Oct.-Dec. 2009.*

Elmqvist, Niklas, U. Assarsson, and P. Tsigas, "Employing Dynamic Transparency for 3D Occlusion Management: Design Issues and Evaluation", C. Baranauskas et al. (Eds.): Interact 2007, LNCS 4662, Part I, pp. 532-545, 2007.*

Fehn, Christoph, "Depth-Image-Based Rendering (DIBR), Compression and Transmission for a New Approach on 3D-TV", Stereoscopic Displays and Virtual Reality Systems XI, A. Woods et al. (Eds.), Proc. of SPIE-IS&T Electronic Imaging, SPIE vol. 5291, 2004.*

Ward, Ben, S. Kang, and E. Bennett, "Depth Director: A System for Adding Depth to Movies", IEEE Computer Graphics and Applications 31.1: 36-48, IEEE, Jan. 2011.*

Fehn, Christoph, "Depth-Image-Based Rendering DIBR, Compression and Transmission for a new approach on 3D-TV", stereoscopic displays and virtual reality systems XI, A. Woods et al. (Eds.), Proc. of SPIE-IS&T Electronic Imaging, SPIE vol. 5291, 2004.*

Chang, Yu-Lin, C. Fang, L. Ding, S. Chen, and L. Chen, "Depth Map generation for 2d-3d conversion by short-term motion assisted color segmentation", 2007 IEEE international conference on multimedia and expo, pp. 1958-1961, 2007.*

* cited by examiner

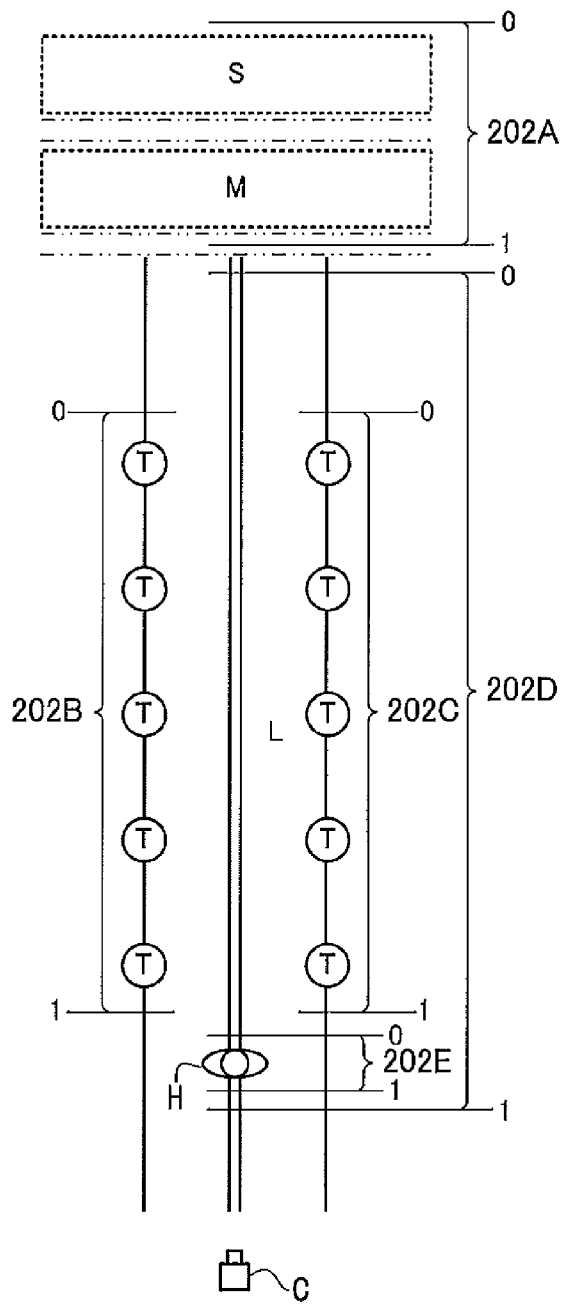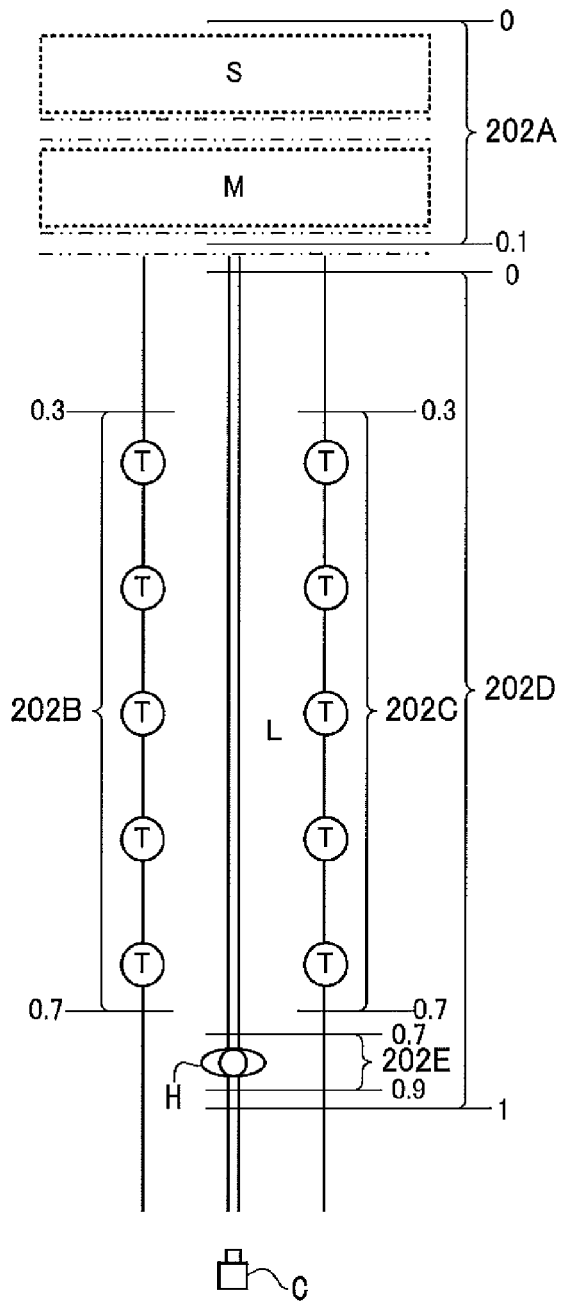
Fig.10A  Fig.10B
Fig.10

STEREOSCOPIC IMAGE GENERATION METHOD AND STEREOSCOPIC IMAGE GENERATION SYSTEM

CROSS-REFERENCE TO RELATED APPLICATION

This application claims priority to Japanese Patent Application No. 2011-94711 filed on Apr. 21, 2011, hereby incorporated in its entirety by reference into this application.

BACKGROUND OF THE INVENTION

1. Field of the Invention

The present invention relates to a stereoscopic image generation method and a stereoscopic image generation system for generating a stereoscopic image that allows the viewer of the image to perceive a stereoscopic effect due to parallax.

2. Description of the Related Art

In recent years, binocular parallax stereoscopic images that allow the viewers to perceive a stereoscopic effect by causing them to view different images with the left and right eyes respectively are being widely used in the field of movies and television and other fields. A technique for multi-view stereoscopic images in which images observable by the viewers are changed according to viewing angles to allow the viewers to perceive a stereoscopic effect is also being used for, for example, naked-eye stereoscopic devices. In addition, multi-view parallax stereoscopic images in which the binocular parallax method and the multi-view method are combined are being put to practical use. A parallax stereoscopic image is composed of a right-eye image presented to the right eye and a left-eye image presented to the left eye. The positions of the subjects in these images are shifted in a horizontal direction according to the binocular parallax of the human eyes to allow the viewer (observer) of the images to perceive a stereoscopic effect.

A conventional parallax stereoscopic image is generally generated by taking a right-eye image and a left-eye image simultaneously using two cameras arranged in a left-right direction. With this method, a right-eye image and a left-eye image with a parallax substantially similar to the binocular parallax of the human eyes can be directly obtained. Therefore, a natural stereoscopic image that does not cause the viewer to have an uncomfortable feeling can be generated.

However, with the method in which two cameras are used to take a right-eye image and a left-eye image, the two cameras must have the same specifications and be aligned correctly, and the images must be taken with the cameras perfectly synchronized with each other. Therefore, when the images are taken, specialized staff and a large number of specialized devices are required. This causes not only an increase in image cost but also a problem in that a large amount of time is required to set up and adjust the cameras and other devices.

A conventional multi-view stereoscopic image is generally generated by taking multi-view images simultaneously using a large number of cameras arranged at different viewpoints. However, the method in which a plurality of cameras are used to take multi-view images has a problem in that the plurality of cameras must have the same specifications and be aligned correctly and that the images must be taken with all the cameras synchronized with each other.

Particularly, to generate a multi-view parallax stereoscopic image, two cameras must be provided for each of different viewpoints so that images with parallax are taken. Therefore, such a multi-view parallax stereoscopic image is far from widespread use, unless there is a very specific purpose.

One technique proposed to address the above issues is to subject an image normally taken using a single camera to image processing to generate binocular parallax right-eye and left-eye images (see, for example, Japanese Patent Application Laid-Open No. 2002-123842). In this technique, first, depth information (a depth value) is set for each of pixels constituting an original image, and the horizontal positions of the pixels are changed according to the depth information to generate right-eye and left-eye images in which the positions of subjects in these images have been shifted according to binocular parallax.

With this technique, a stereoscopic image can be generated from a normal original image taken using a commonly used camera, and therefore photographing cost and photographing time can be reduced. In addition, stereoscopic images can be generated from existing movie and other contents, and general television programs can be converted to stereoscopic images and displayed on a television screen.

However, in the conventional method of generating a stereoscopic image from a normal original image, the value of the depth information varies across the boundary between, for example, a human, or a subject, and a background, and this causes a problem in that a depth discontinuity occurs.

If such a depth discontinuity occurs, an unnatural stereoscopic effect such as a so-called cardboard effect in which only the distance between a human or the like and a background is emphasized to cause the human image to be monotonous is perceived. In addition, when the positions of the pixels in the right-eye and left-eye images are changed, the amounts of movement of pixels contained in the human or the like are largely different from that of pixels contained in the background. Therefore, a large gap (loss) is formed in a part of the background that, in the original image, is covered with the human or the like.

In some conventional methods, to avoid such a gap, blurring processing is performed on boundary portions, or the image of a human or the like or a background is enlarged or deformed. However, such processing may rather cause the viewer to have an uncomfortable feeling due to the boundary portions where parallax is not given. Also, with such boundary processing, the quality of the stereoscopic deteriorates disadvantageously. In addition, the problem with the blurring processing and the enlarging-deforming processing is that the operational load on the operator who performs such processing on the stereoscopic image using software increases. This results in a problem in that the amount of processing work of the operator becomes enormous when a multi-view or multi-view parallax stereoscopic image is generated from an original image.

In the conventional method, the original value of the hue, chroma, or brightness of each of the pixels constituting the original image (the chroma in Japanese Patent Application Laid-Open No. 2002-123842 above) is generally used as the depth information for each of the pixels. Therefore, the value of the depth information varies significantly across the boundary between a human being a subject or the like and a background. This causes a problem in that the depth discontinuity is likely to be emphasized.

Original images contain various elements such as the intention of the producer and a story. In such a case, it is important to emphasize an important subject that the producer wants the viewers to pay much attention and to emphasize a focused region in an original image. In contrast, it is important to make adjustments such that unimportant regions and blurred regions are not emphasized. However, in the conventional method, depth information is routinely computed over the entire area of an original image, and the computed depth information is used as is. Therefore, one problem with the conventional method is that it is difficult to reflect the intention of the producer in a stereoscopic manner.

SUMMARY OF THE INVENTION

In view of the above circumstances, the present invention provides a stereoscopic image generation method and a stereoscopic image generation system that can generate, from an original image, a stereoscopic image that allows a viewer to perceive a natural stereoscopic effect.

To achieve the above object, a first aspect of the present invention provides a stereoscopic image generation method including: a region setting step of setting a plurality of regions in an original image; a characteristic information acquisition step of acquiring characteristic information for each of pixels constituting the original image; a depth information generation step of generating depth information for each of the pixels for each of the plurality of regions on the basis of the characteristic information; and a stereoscopic image generation step of generating a stereoscopic image in which positions of the pixels are changed based on the depth information.

In the stereoscopic image generation method for achieving the above object, in the region setting step of the above aspect of the present invention, the regions can be set corresponding to subjects contained in the original image.

In the stereoscopic image generation method for achieving the above object, the stereoscopic image generation step of the above aspect of the present invention can include an individual stereoscopic image generation step of generating, for each of the plurality of regions, an individual stereoscopic image in which the positions of pixels are changed and a stereoscopic image combining step of combining the plurality of individual stereoscopic images generated for the plurality of regions to generate the stereoscopic image.

In the stereoscopic image generation method for achieving the above object, in the stereoscopic image combining step of the above aspect of the present invention, the plurality of individual stereoscopic images can be combined on the basis of front-rear relationships between the plurality of individual stereoscopic images such that any rear individual stereoscopic image of the plurality of individual stereoscopic images appears through any front individual stereoscopic image of the plurality of individual stereoscopic images.

In the stereoscopic image generation method for achieving the above object, the stereoscopic image combining step of the above aspect of the present invention can include a depth information combining step of combining the pieces of depth information generated for the plurality of regions, and the stereoscopic image is generated using the combined pieces of depth information.

In the stereoscopic image generation method for achieving the above object, the region setting step of the above aspect of the present invention can include a rear-side color value estimation step of estimating, in an overlapping area in which a front one of the regions and a rear one of the regions overlap each other, a color value of a pixel in the rear one of the regions.

In the stereoscopic image generation method for achieving the above object, the depth information generation step of the above aspect of the present invention can include a depth correlation adjusting step of adjusting the pieces of depth information generated for each of the regions on the basis of relative front-rear relationships between the plurality of regions.

In the stereoscopic image generation method for achieving the above object, the depth information generation step of the above aspect of the present invention can include an edge setting step of setting an edge for each of pairs of pixels extracted from the original image, a weight information setting step of setting weight information for each of the edges on the basis of the characteristic information, a start area selection step of selecting a start area from the pixels, a path information setting step of computing a path with regard to the weight information from the start area to each of the pixels and setting path information for each of the pixels, and a depth determination step of setting depth information for each of the pixels on the basis of the path information for the pixel.

In the stereoscopic image generation method for achieving the above object, in the start area selection step of the above aspect of the present invention, a pixel contained in an area for a deepest part in each of the plurality of regions or a pixel contained in an area for a frontmost part in the each of the plurality of regions can be selected as the start area.

In the stereoscopic image generation method for achieving the above object, in the start area selection step of the above aspect of the present invention, a plurality of start areas are selected.

To achieve the above object, a second aspect of the present invention provides a stereoscopic image generation system constituted by a computer and including: region setting means for setting a plurality of regions in an original image; characteristic information acquisition means for acquiring characteristic information for each of pixels constituting the original image; depth information generation means for generating depth information for each of the pixels for each of the plurality of regions on the basis of the characteristic information; and stereoscopic image generation means for generating a stereoscopic image in which positions of the respective pixels are changed on the basis of the pieces of depth information.

The present invention has an advantageous effect in that a stereoscopic image that allows the viewer to perceive a natural stereoscopic effect can be generated from an original image.

BRIEF DESCRIPTION OF THE DRAWINGS

The above and other objects, features and advantages of the present invention will become apparent from the following description and appended claims, taken in conjunction with the accompanying drawings.

FIG. 10A is a diagram illustrating the status of unadjusted depth information in the stereoscopic image generation system, and FIG. 10B is a diagram illustrating the status of adjusted depth information;

DETAILED DESCRIPTION OF THE PREFERRED EMBODIMENTS

Preferred embodiments of the present invention will next be described in detail with reference to the drawings.

Figure 1:
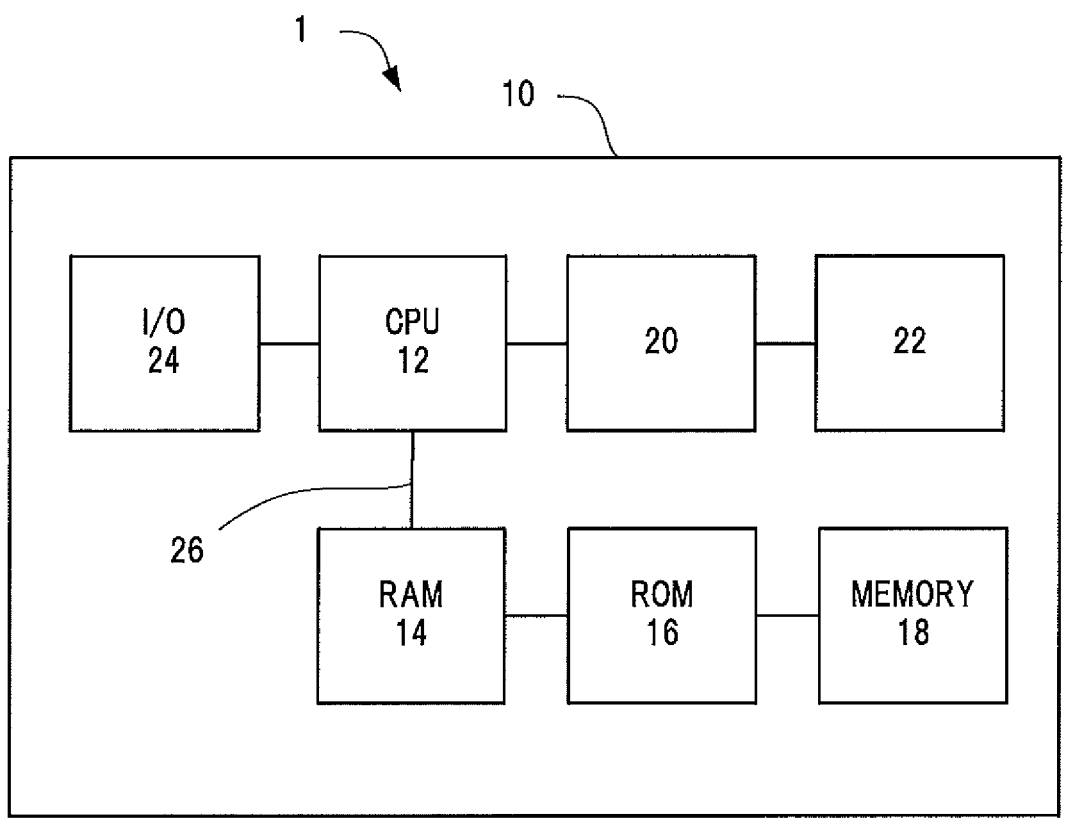
FIG. 1 is a block diagram illustrating the hardware configuration of a stereoscopic image generation system according to a first embodiment of the present invention.

FIG. 1 shows the internal configuration of a computer 10 constituting a stereoscopic image generation system 1 according to a first embodiment. The computer 10 is configured to include a CPU 12, a first storage medium 14, a second storage medium 16, a third storage medium 18, an input unit 20, a display unit 22, an input-output interface 24, and a bus 26. The CPU 12 is a central processing unit and executes various programs to realize various functions of the stereoscopic image generation system 1. The first storage medium 14 is a RAM (random access memory) and is a memory used as the work area of the CPU 12. The second storage medium 16 is a ROM (read only memory) and is a memory for storing basic programs executed on the CPU 12. The third storage medium 18 includes a hard disk drive provided internally with a magnetic disk, a disk drive containing a CD, DVD, or BD, a nonvolatile semiconductor flash-memory device, and other devices. The third storage medium 18 stores OS (operating system) programs for implementing the overall basic operations of the stereoscopic image generation system 1, stereoscopic image generation programs that are executed on the CPU 12 when a stereoscopic image is generated, various types of data such as a depth map used by the stereoscopic image generation programs and stereoscopic images, and other programs and data. The input unit 20 includes a keyboard, a mouse, and the like, and is a unit used by the operator to appropriately input information to the stereoscopic image generation system 1. The display unit 22 is a display for providing a visualized interface to the operator. The input-output interface 24 is an interface for inputting the data of an original image necessary for the stereoscopic image generation programs and outputting a depth map and a stereoscopic image generated by the stereoscopic image generation programs to the outside. The bus 26 is wiring used to mutually connect the CPU 12, the first storage medium 14, the second storage medium 16, the third storage medium 18, the input unit 20, the display unit 22, the input-output interface 24, and other units to achieve communications.

Figure 2:
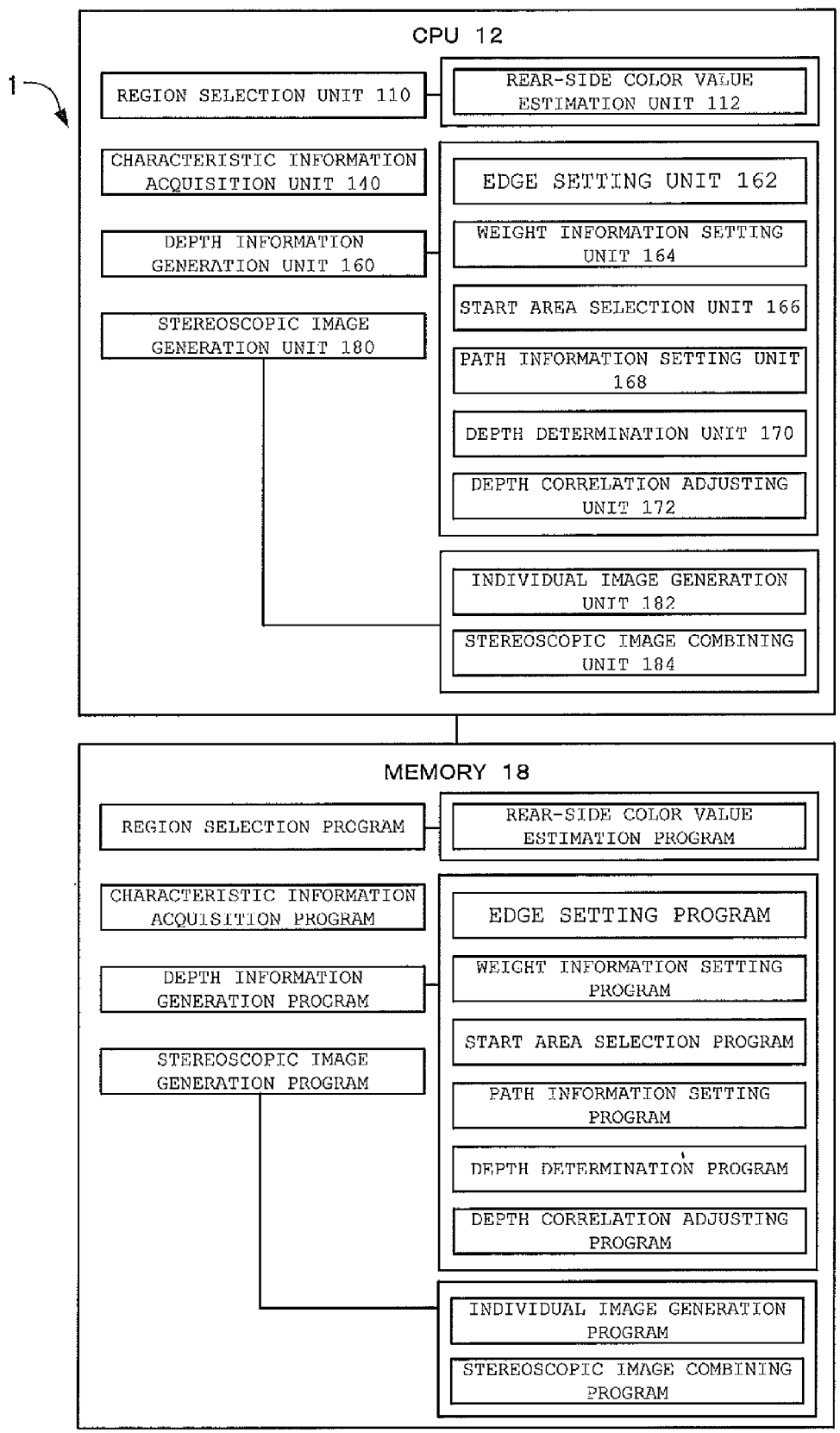
FIG. 2 is a block diagram illustrating the program configuration and functional configuration of the stereoscopic image generation system.
Figure 3:
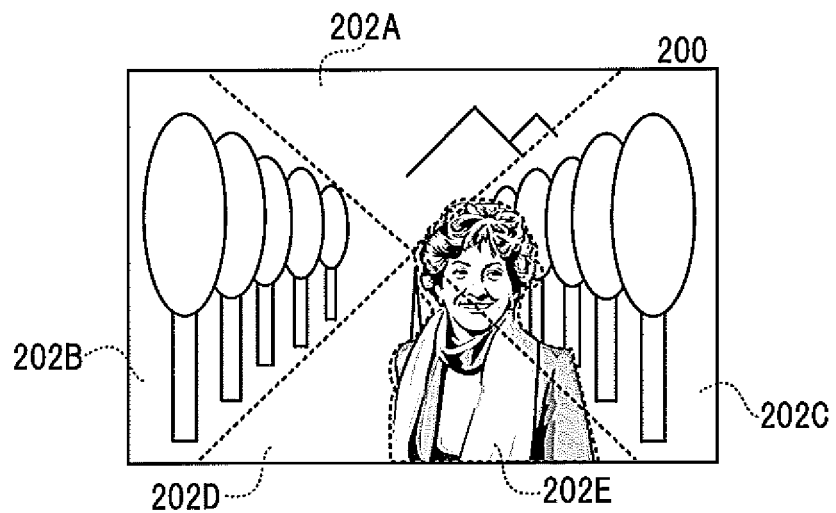
FIG. 3 is a block diagram illustrating selection of regions in an original image in the stereoscopic image generation system.
Figure 4:
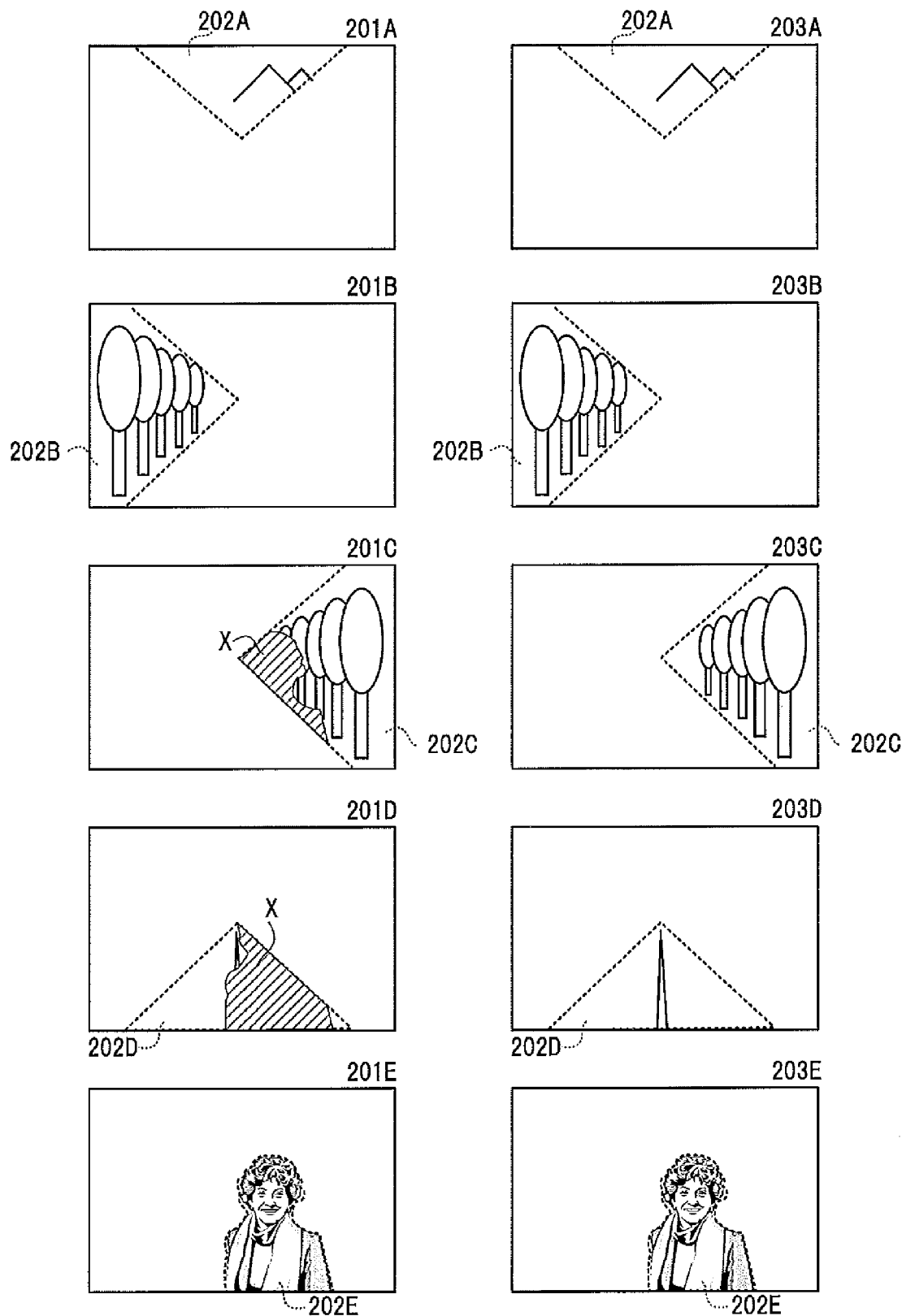
FIGS. 4A and 4B are block diagrams illustrating a method of correcting individual images in the stereoscopic image generation system.
Figure 5:
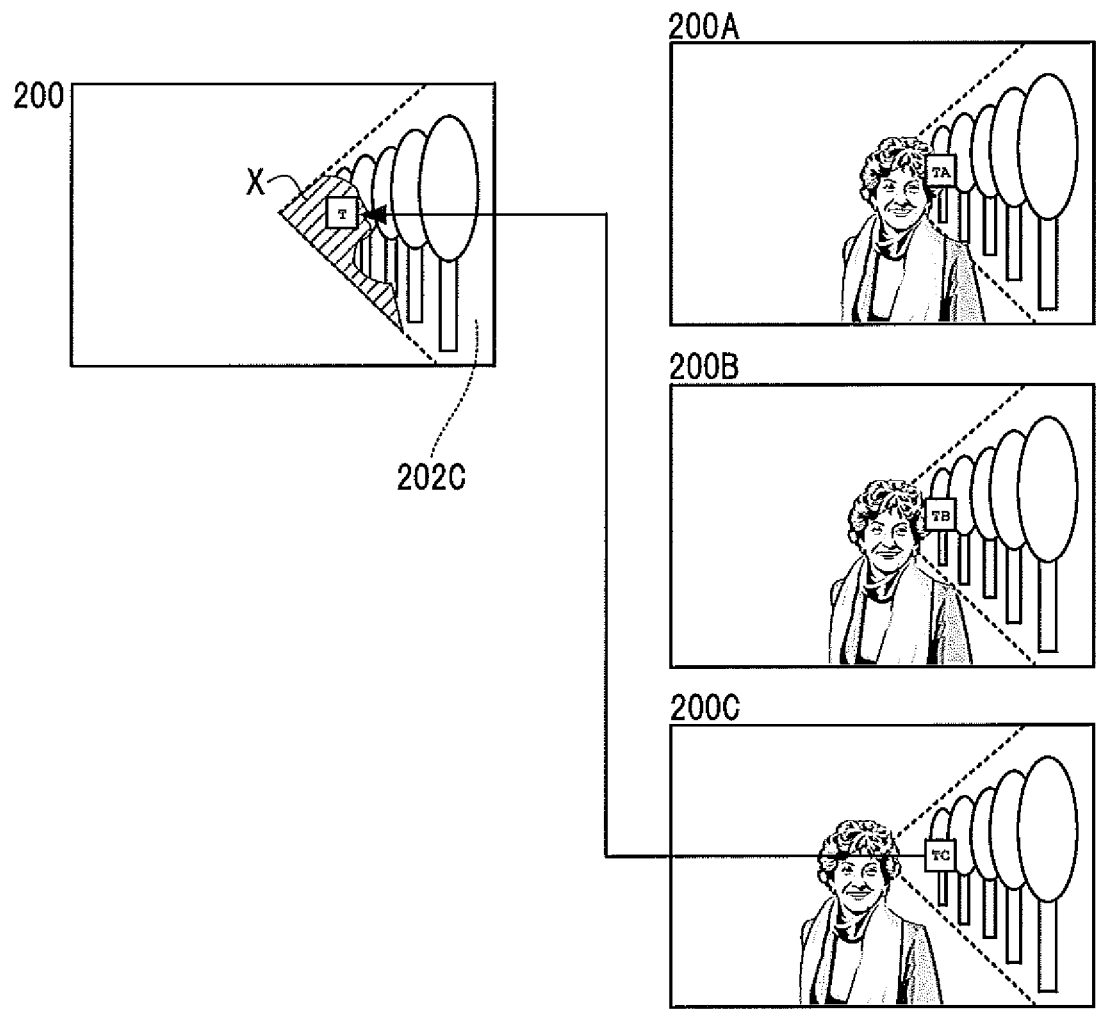
FIG. 5 is a block diagram illustrating the method of correcting individual images in the stereoscopic image generation system.

FIG. 2 shows the program configuration of the stereoscopic image generation programs stored in the third storage medium 18 and the functional configuration of the functions implemented in the stereoscopic image generation system 1 when the CPU 12 executes these stereoscopic image generation programs. FIGS. 3 to 5 schematically show the procedure for generating a stereoscopic image that is executed in the stereoscopic image generation system 1. In the stereoscopic image generation system 1, the configuration of the stereoscopic image generation programs has a correspondence with the configuration of the functions. Therefore, only the functional configuration of the stereoscopic image generation system 1 will be described, and the description of the programs is omitted here.

The stereoscopic image generation system 1 is configured to include a region selection unit 110 implemented by a region selection program, a characteristic information acquisition unit 140 implemented by a characteristic information acquisition program, a depth information generation unit 160 implemented by a depth information generation program, and a stereoscopic image generation unit 180 implemented by a stereoscopic image generation program.

The region selection unit 110 selects a plurality of regions in an original image 200. Particularly, in the present embodiment, the region selection unit 110 selects a plurality of regions 202A to 202E including, as main units, subjects contained in the original image 200, and the plurality of regions 202A to 202E overlap each other. More specifically, as shown in FIG. 3, the first region 202A occupies the upper part of the original image 200 and is located at the rearmost part including mountains. The second region 202B and the third region 202C are located on the front side of the first region 202A and occupy left and right sides of a central road. The fourth region 202D is the central road that occupies the lower part of the original image 200 and is located at a depth comparable to the depth of the second and third regions 202B and 202C. The fifth region 202E is located on the frontmost side and overlaps the third region 202C and the fourth region 202D. The outline of the fifth region 202E coincides with the outline of a woman. Individual original images 201A to 201E separated for the regions 202A to 202E are obtained from the original image 200, and the individual original image 201E for the fifth region 202E and the individual original images 201C and 201D for the third region 202C and the fourth region 202D overlap each other in an overlapping area X. Therefore, in the overlapping area X, the color values of pixels in the individual original images 201C and 201D are missing, as shown in FIG. 4A.

In the present embodiment, to compensate for the missing color values, the region selection unit 110 includes a rear-side color value estimation unit 112. The rear-side color value estimation unit 112 estimates, in the overlapping area X in which the region on the front side overlaps the region on the rear side, the color values of pixels in the region on the rear side. As shown in FIG. 5, for example, when the original image 200 is a part of a moving image including other original images (frames) 200A to 200C, the color value of a pixel T in the overlapping area X in the individual original image 201C for the third region 202C is estimated using the color values of pixels TA to TC in other original images 200A to 200C that are located at the same position as the position of the pixel T. In the original image 200C, since the woman on the front side has moved to the left, the color value of a tree line can be recognized at the pixel TC. The color value of the pixel TC in the original image 200C is applied to the color value of the pixel T in the original image 200. The color values of all the pixels 204 contained in the overlapping area X are determined in this manner to complete a moving image of subjects in the entire regions. As a result of the above procedure performed on the original image 200, corrected individual original images 203A to 203E in which the missing color values in the overlapping area X have been corrected are obtained as shown in FIG. 4B.

In the example shown in the present embodiment, the color values are estimated using the original images 200A to 200C in other frames in the moving image, but the present invention is not limited thereto. For example, the color values in the overlapping area X in the original image 200 can be estimated from the color values of pixels 204 around the overlapping area X. It is not necessary to estimate the color values of all the pixels 204 in the overlapping area X, and the color values of pixels 204 near the outline (peripheral edge) of the overlapping area X may be mainly estimated.

Figure 6:
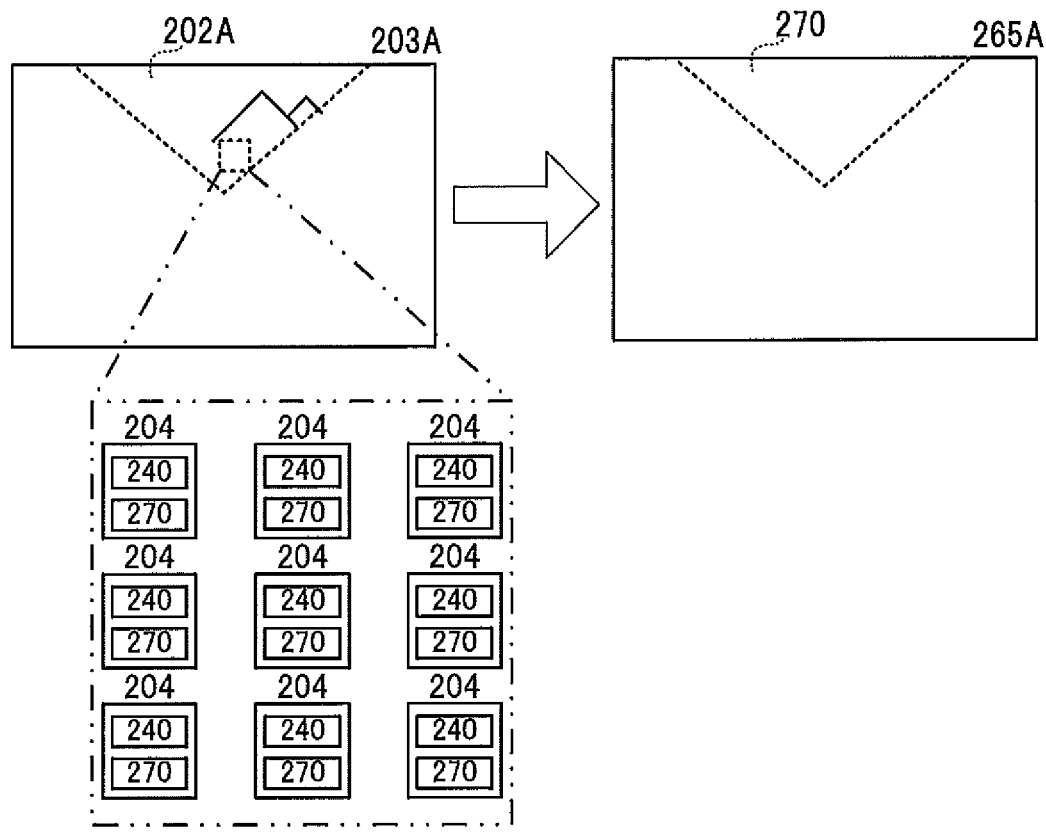
FIG. 6 is a schematic diagram illustrating the generation of an individual depth map in the stereoscopic image generation system.
Figure 7:
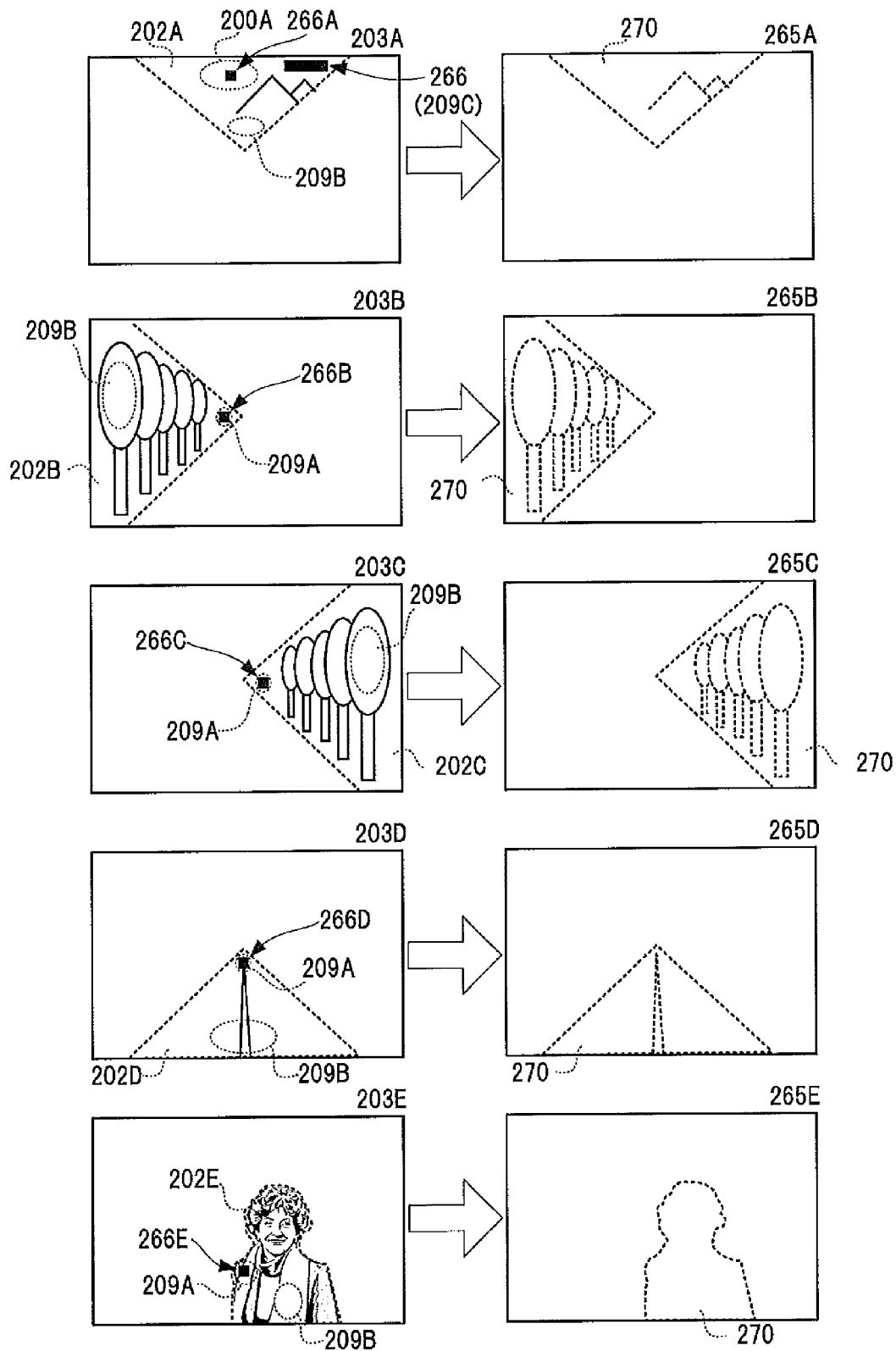
FIG. 7 is a series of schematic diagrams illustrating the generation of depth maps in the stereoscopic image generation system.

As shown in FIGS. 6 and 7, the characteristic information acquisition unit 140 acquires characteristic information 240 for each of the pixels 204 constituting the original image 200. Particularly, in this embodiment, the pieces of characteristic information 240 of the pixels 204 in the corrected individual original images 203A to 203E are acquired. For example, the characteristic information 204 may be characteristic information for a single pixel 204 such as its hue, brightness, chroma, or color space. In addition, characteristic information derived from the relationship between an object pixel 204 and its surrounding pixels 204 may be used. When a moving image including a plurality of frames is used, characteristic information derived from a temporal change in characteristics of a pixel 204 (the relationship in characteristics between a pixel in a frame and the same pixel in the previous or subsequent frame) may also be used.

The depth information generation unit 160 sets depth information 270 for each of the pixels 204 independently for each of the regions 202A to 202E using the characteristic information 240 acquired for each pixel 204. More specifically, in this example, depth information 270 is set for each of the pixels 204 in the corrected individual original images 203A to 203E. Individual depth maps 265A to 265E are thereby generated as groups of pieces of depth information 270 for the corrected individual original images 203A to 203E.

More specifically, returning to FIG. 2, the depth information generation unit 160 includes an edge setting unit 162, a weight information setting unit 164, a start area selection unit 166, a path information setting unit 168, a depth determination unit 170, and a depth correlation adjusting unit 172.

Figure 8:
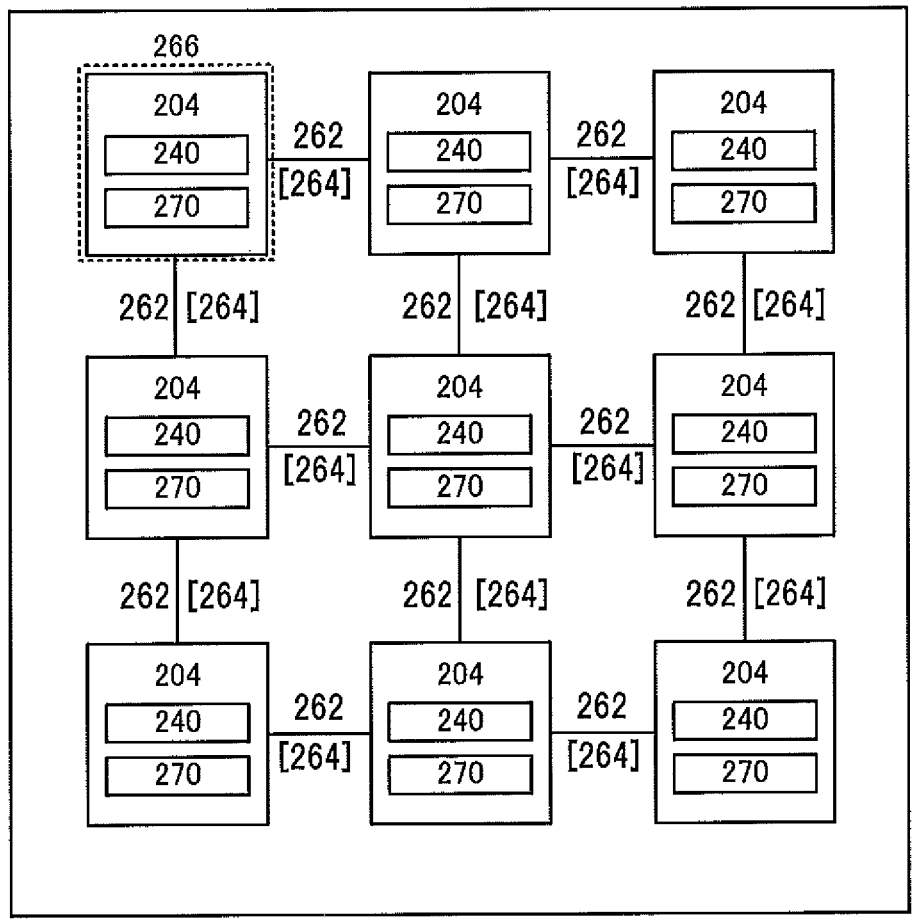
FIG. 8 is a diagram illustrating the procedure for computing shortest-path information in the stereoscopic image generation system.

As shown in FIG. 8, the edge setting unit 162 sets an edge 262 for each of pairs of pixels 204 extracted from the original image 200. The edge 262 conceptually means a line or a path connecting a pair of pixels 204. In the sense of graph theory, a pair of pixels 204 are nodes or vertices, and an edge 262 is a branch or a side. In the present embodiment, four edges 262 are set between each pixel 204 and its adjacent upper, lower, left, and right pixels 204. However, the present invention is not limited to the case in which edges 262 are set between each pixel 204 and its adjacent upper, lower, left, and right pixels 204. Edges 262 may be set between each pixel 204 and its four diagonally adjacent pixels 204 (upper right, upper left, lower right, and lower left pixels) or between each pixel 204 and eight pixels 204 including these pixels and upper, lower, left, and right pixels. It is not always necessary to set an edge 262 between adjacent pixels 204. An edge 262 may be set for a pair of pixels 204 separated from each other by a predetermined distance with omitting another pixel(s) interposed therebetween, i.e., for a pair of pixels 204 after thinning-out processing. Of course, an edge 262 may be set for a pair of pixels 204 isolated by a large distance.

The weight information setting unit 164 sets weight information 264 for each edge 262 on the basis of the pieces of characteristic information 240 of pixels 204 connected by the edge 262. In the present embodiment, the weight information 264 of an edge 262 is set using the difference between the pieces of characteristic information 240 of a pair of pixels 204 connected by the edge 262. The weight information 264 increases as the difference increases and decreases as the difference decreases. The weight information 264 of an edge 262 is not limited to the "difference" between a pair of pieces of characteristic information 240 of pixels 204 at opposite ends of the edge 262. The weight information 264 may be set using, for example, any of various functions for computing the weight information using the pair of pieces of characteristic information 240.

The start area selection unit 166 selects a start area 266 among the pixels 204 in the original image 200. The start area 266 is used as a start point when shortest-path information 268 described later is set. In this example, the region selection unit 110 divides the original image 200 into a plurality of corrected individual original images 203A to 203E. Therefore, the start area selection unit 166 selects start areas 266A to 266E for the corrected individual original images 203A to 203E.

The start areas 266A to 266E can be freely selected from the pixels 204 in the corrected individual original images 203A to 203E. For example, as shown in FIG. 7, it is preferable to select the start areas 266A to 266E from groups of pixels in deepest areas 209A located in the deepest parts in the corrected individual original images 203A to 203E, or groups of pixels in frontmost areas 209B located in the frontmost parts in the corrected individual original images 203A to 203E. In addition, as shown in the corrected individual original image 203A in FIG. 7, all the pixels 204 in a predetermined area 209C may be selected collectively as one start area 266.

In the present embodiment, single pixels are selected as the start areas 266A to 266E from the deepest areas 209A in the corrected individual original images 203A to 203E.

Figure 9:
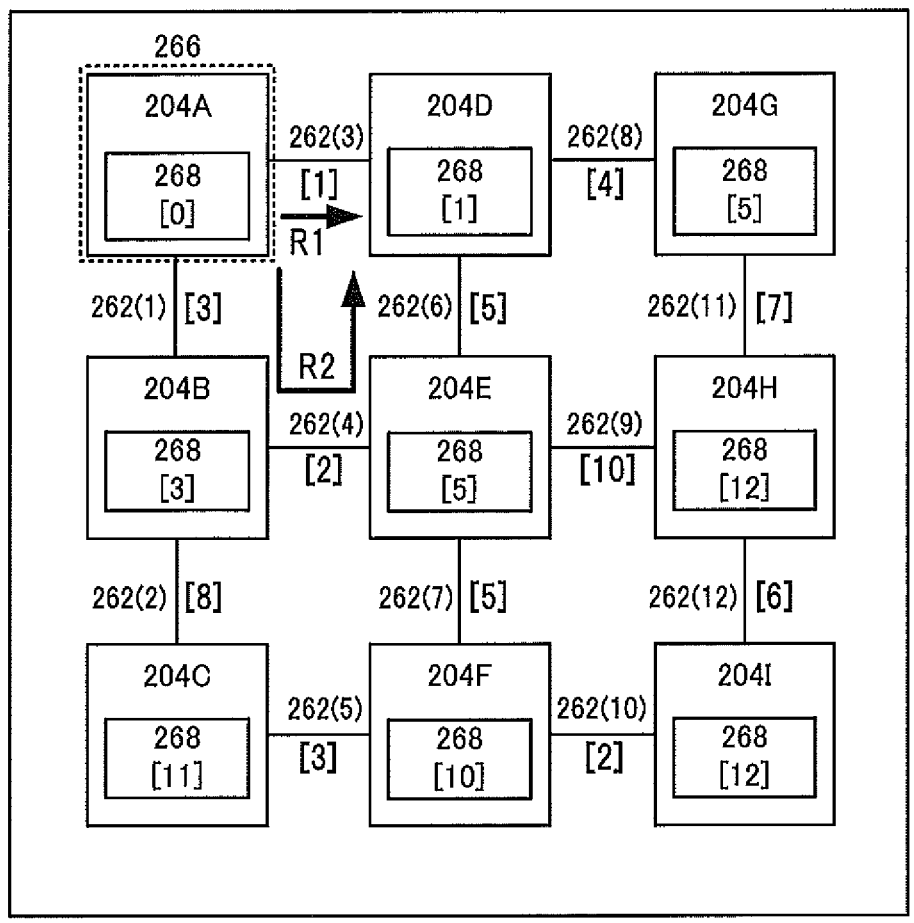
FIG. 9 is a diagram illustrating an example in which shortest-path information is computed in the stereoscopic image generation system.

The path information setting unit 168 computes the shortest path from each of the start areas 266A to 266E to each of the pixels 204 in a corresponding one of the plurality of regions 202A to 202E, i.e., the corrected individual original images 203A to 203E, using the pieces of weight information 264 of single paths (edges 262) and sets the shortest-path information 268 for the each of the pixels 204 in the corrected individual original images 203A to 203E. A specific example of this procedure will be described with reference to FIG. 9.

To simplify the description, suppose that the original image 200 is composed of nine pixels 204A to 204I arranged in three rows and three columns and that the upper left pixel 204A is a pixel for a region located on the deepest side and is set as a start area 266. One of pieces of weight information 264 ranging from 1 to 10 is pre-set for each of twelve edges 262(1) to 262(12) connecting the pixels 204A to 204I using the relative differences between the pieces of characteristic information (not shown) of the pixels 204A to 204I. Now consider the path to the upper central pixel 204D. Examples of the path connecting the start pixel 204A and the pixel 204D include a first path R1 composed only of the edge 262(3) directly connecting the start pixel 204A and the pixel 204D and a second path R2 composed of three edges 262(1), 262(4), and 262(6) that connect the start pixel 204A, the pixel 204B, the pixel 204E, and the pixel 204D. The sum of the pieces of weight information 264 in the first path R1 is "1," and the sum of the pieces of weight information 264 in the second path R2 is "10" being 3+2+5. The sum of the pieces of weight information 264 is similarly computed for all the possible paths between the start pixel 204A and the pixel 204D, and the path having the smallest sum is used as the shortest path. In the above example, the first path R1 is the shortest path, and therefore the sum of the pieces of weight information 264 in the shortest path that is "1" in the first path R1 is set as the shortest-path information 268 for the pixel 204D.

The path information setting unit 168 sets the shortest-path information 268 for all the pixels 204A to 204I using the method described above. As a result of this procedure, "0" is set as the shortest-path information 268 for the pixel 204A, "3" is set for the pixel 204B, "11" is set for the pixel 204C, "1" is set for the pixel 204D, "5" is set for the pixel 204E, "10" is set for the pixel 204F, "5" is set for the pixel 204G, "12" is set for the pixel 204H, and "12" is set for the pixel 204I.

The depth determination unit 170 sets the depth information 270 for each pixel 204 on the basis of the shortest-path information 268. In the present embodiment, the depth determination unit 170 uses the pieces of shortest-path information 268 as they are as the pieces of depth information 270.

Particularly, in the example shown, pieces of depth information 270 can be determined independently for each of the regions 202A to 202E set in the original image 200. In the present embodiment, the original image 200 contains part of the central woman, left and right tree lines, central road, and sky on the background side. For example, if clear stereoscopic continuity should not be given to the boundaries between these subjects, these subjects are selected as the regions 202A to 202E, and pieces of depth information 270 can thereby be set independently for each of these subjects. Therefore, optimal start areas 266A to 266E are selected for the regions 202A to 202E, and the pieces of depth information 270 in these regions are computed by the shortest path method, so that the pieces of depth information 270 obtained are continuous and very fine. The individual depth maps 265A to 265E are obtained by visually mapping the pieces of depth information 270 set for the pixels 204.

If necessary, values obtained by correcting the pieces of shortest-path information 268 may be used as the pieces of depth information 270. Different correction functions may be prepared for different original images 200 such as an image of an outdoor scene and an image of an indoor scene, and one of the correction functions selected according to the contents of the original image 200 may be applied to the piece of shortest-path information 268 to compute the pieces of depth information 270. Alternatively, different correction functions prepared for different types of subjects may be applied to the corrected individual original images 203A to 203E to compute pieces of depth information 270.

Particularly, as in the present embodiment, when start areas 266A to 266E are set independently for the regions 202A to 202E, the shortest-path information 268 of each of the start areas 266A to 266E is "zero." Therefore, if these pieces of shortest-path information 268 are used as they are as the pieces of depth information 270, the relative sense of depth may differ between the plurality of individual depth maps 265A to 265E. Preferably, the depth determination unit 170 determines the pieces of depth information 270 after the pieces of shortest-path information 268 are collectively corrected for each of the individual depth maps 265A to 265E. For example, a constant correction value for front-side shifting is added to the pieces of shortest-path information 268 of all the pixels 204 in the fifth individual depth map 265E for the fifth region 202E on the front side while the pieces of shortest-path information 268 in the first individual depth map 265A for the first region 202A on the background side are used without any correction, and the resultant values are used as the pieces of depth information 270. In this manner, the sense of depth is corrected for each of the individual depth maps 265A to 265E. A delicate and smooth stereoscopic effect can thereby be imparted to each of the regions 202A to 202E, and a clear difference in stereoscopic effect with optimal distance differences can be obtained between the plurality of individual depth maps 265A to 265E.

Figures 11, 11A, 11B:
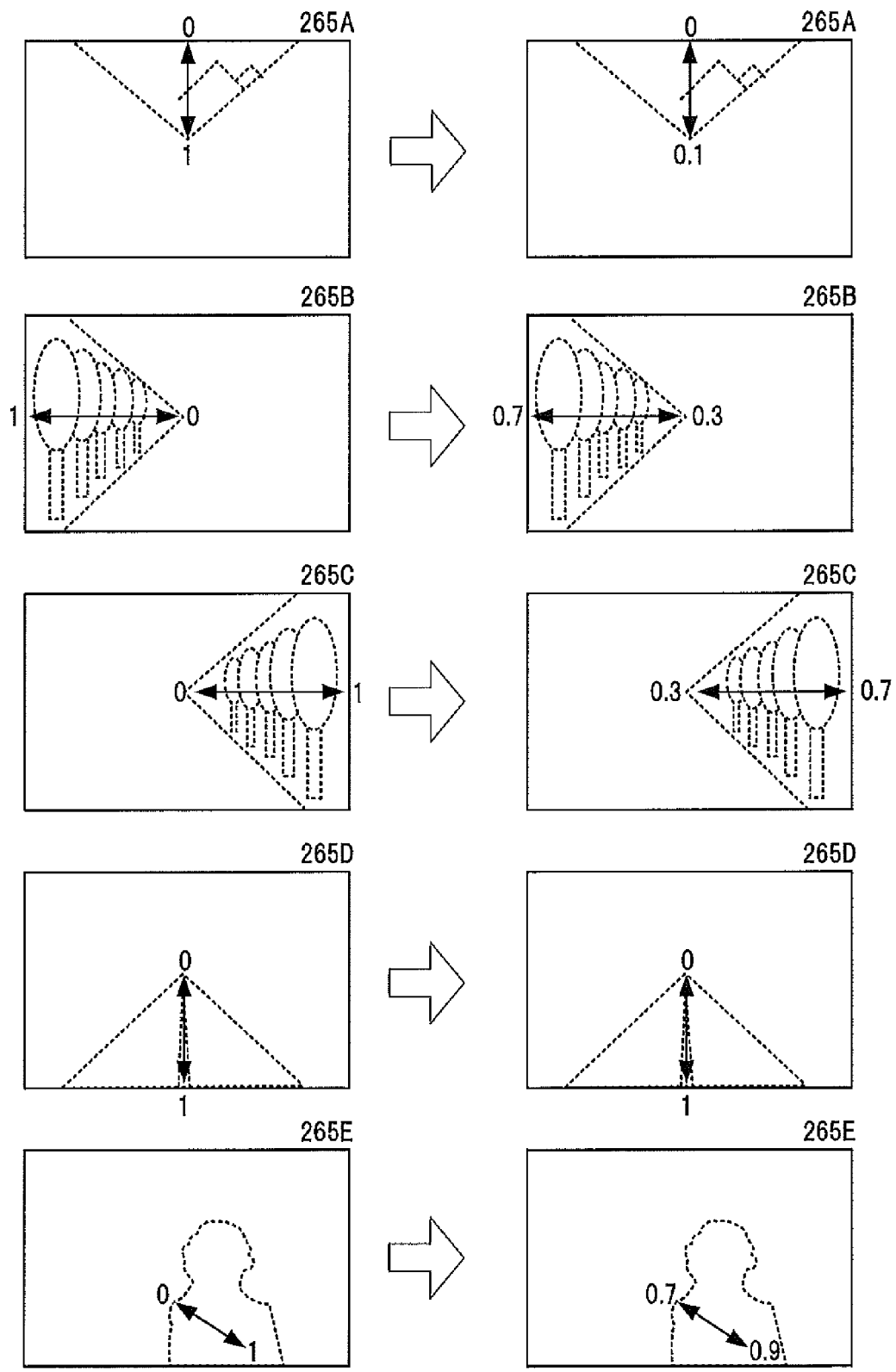
FIG. 11A is a series of diagrams illustrating the status of the unadjusted depth information in the stereoscopic image generation system.
FIG. 11B is a series of diagrams illustrating the status of the adjusted depth information.

A description will be given of examples of the pieces of depth information 270 in the individual depth maps 265A to 265E when the depth information 270 at the farthest distance is defined as 0 and the depth information 270 at the closes distance is defined as 1. FIGS. 10A and 10B schematically show an actual scene viewed from above when the original image 200 is taken by a camera C. As shown in FIGS. 10A and 11A, a sky S and mountains M are the subjects in the first region 202A in the original image 200. The pieces of depth information 270 in the individual depth map 265A for the first region 202A are set to 0 for farthest parts and to 1 for closest parts. The tree lines T are the subjects in the second region 202B and the third region 202C, and the pieces of depth information 270 in the individual depth maps 265B and 265C for the second region 202B and the third region 202C are set to 0 for farthest parts and to 1 for closest parts. The road L is the subject in the fourth region 202D, and the pieces of depth information 270 in the individual depth map 265D for the fourth region 202D are set to 0 for farthest parts and to 1 for closest parts. The woman H is the subject in the fifth region 202E, and the pieces of depth information 270 in the individual depth map 265E for the fifth region 202E are set to 0 for farthest parts and to 1 for closest parts.

More specifically, since the depth determination unit 170 determines the pieces of depth information 270 independently for each of the regions 202A to 202E, the relative scales in these regions are different. Therefore, if these individual depth maps 265A to 265E are used as they are, the relative relationships between the depths in the regions 202A to 202E may contain errors.

Therefore, the depth correlation adjusting unit 172 corrects (adjusts), on the basis of the relative front-rear relationships between the regions 202A to 202E, the pieces of depth information 270 determined independently for each of the regions 202A to 202E. Specific examples of the correction by the depth correlation adjusting unit 172 are shown in FIGS. 10B and 11B. The pieces of depth information 270 in the individual depth map 265A for the first region 202A are corrected to be 0 for farthest parts and 0.1 for closest parts. More specifically, although the first region 202A is located on the deepest side, the range of the sense of depth (the range of the depth) in the first region 202A is set to 0.1 so that almost no stereoscopic effect is perceived. Actually, human eyes cannot perceive a 3D stereoscopic effect from mountains and clouds located at very large distances. The pieces of depth information 270 in the individual depth maps 265B and 265C for the second region 202B and the third region 202C are corrected to be 0.3 for farthest parts and 0.7 for closest parts.

The pieces of depth information 270 in the individual depth map 265D for the fourth region 202D are corrected to be 0 for farthest parts and 1 for closest parts. Under the original positional relationships, the range of the pieces of depth information 270 of the road L (subject) is a part of the entire depth range (0 to 1), and therefore these pieces of depth information 270 do not vary in the entire depth range. However, in this case, a determination based on the intention of the producer of the original image 200 is made that it is important to emphasize the sense of depth of the road L, and therefore the range of the depth is increased. The pieces of depth information 270 in the individual depth map 265E for the fifth region 202E are corrected to be 0.7 for farthest parts and 0.9 for closest parts.

Figure 12:
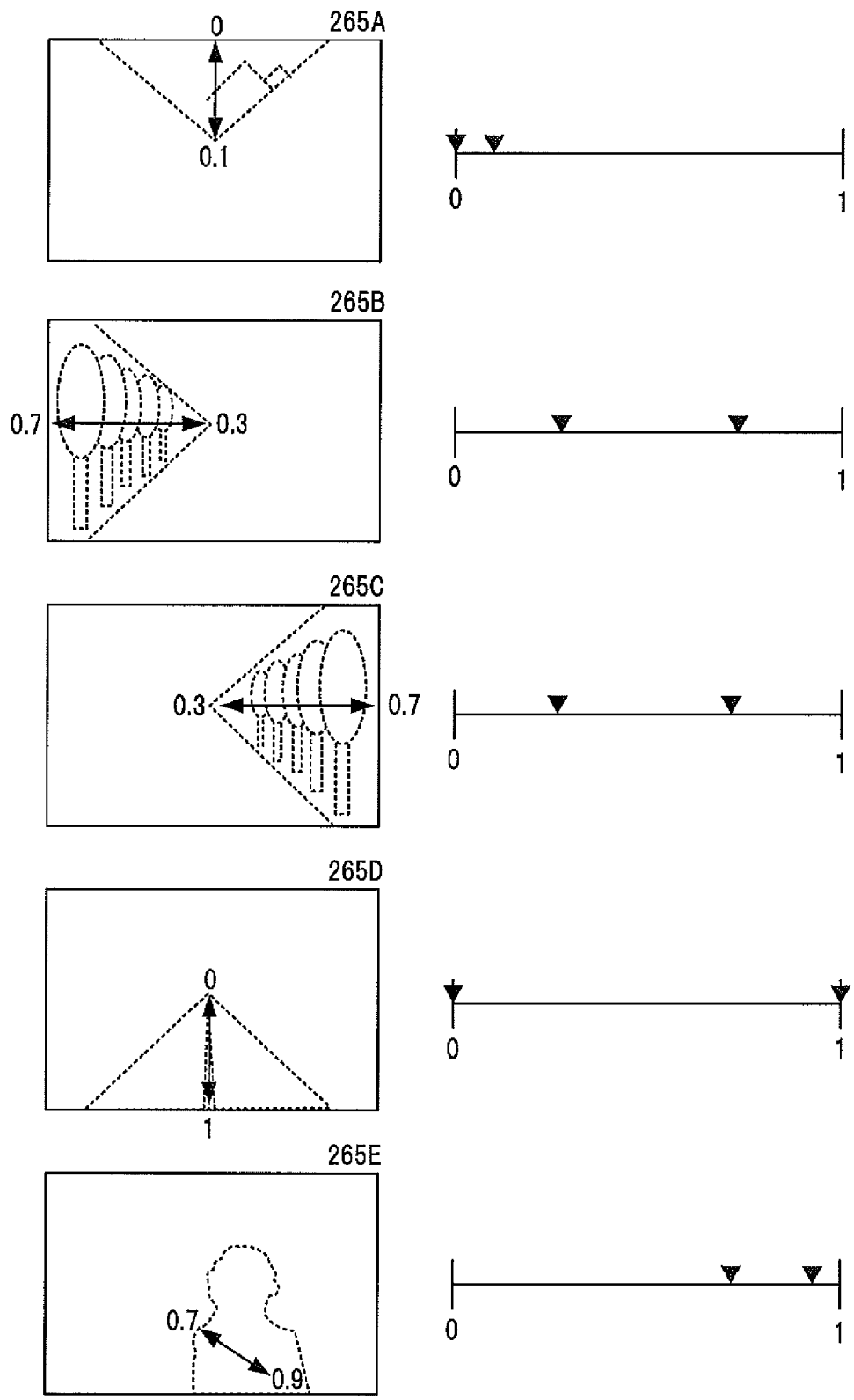
FIG. 12 is a series of diagrams illustrating the status of input displays used to adjust the correlation between pieces of depth information in the stereoscopic image generation system.

Preferably, the adjustment of correlations by the depth correlation adjusting unit 172 is performed by displaying the individual depth maps 265A to 265E shown in FIG. 11A on the display unit 22 to request the input of corrected values and scales for the deepest and frontmost parts. Alternatively, for example, the adjustment of correlations may be performed by displaying, on the display unit 22, bar charts representing the pieces of depth information 270 for the individual depth maps 265A to 265E and shifting the ranges set in the bar charts, as shown in FIG. 12. Then a stereoscopic image is generated using the adjusted individual depth maps 265A to 265E.

The stereoscopic image generation unit 180 generates, on the basis of the plurality of individual depth maps 265A to 265E generated individually for the plurality of regions 202A to 202E, a stereoscopic image 280 composed of a right-eye image 280A and a left-eye image 280B in which the positions of the pixels 204 have been changed.

Figure 13:
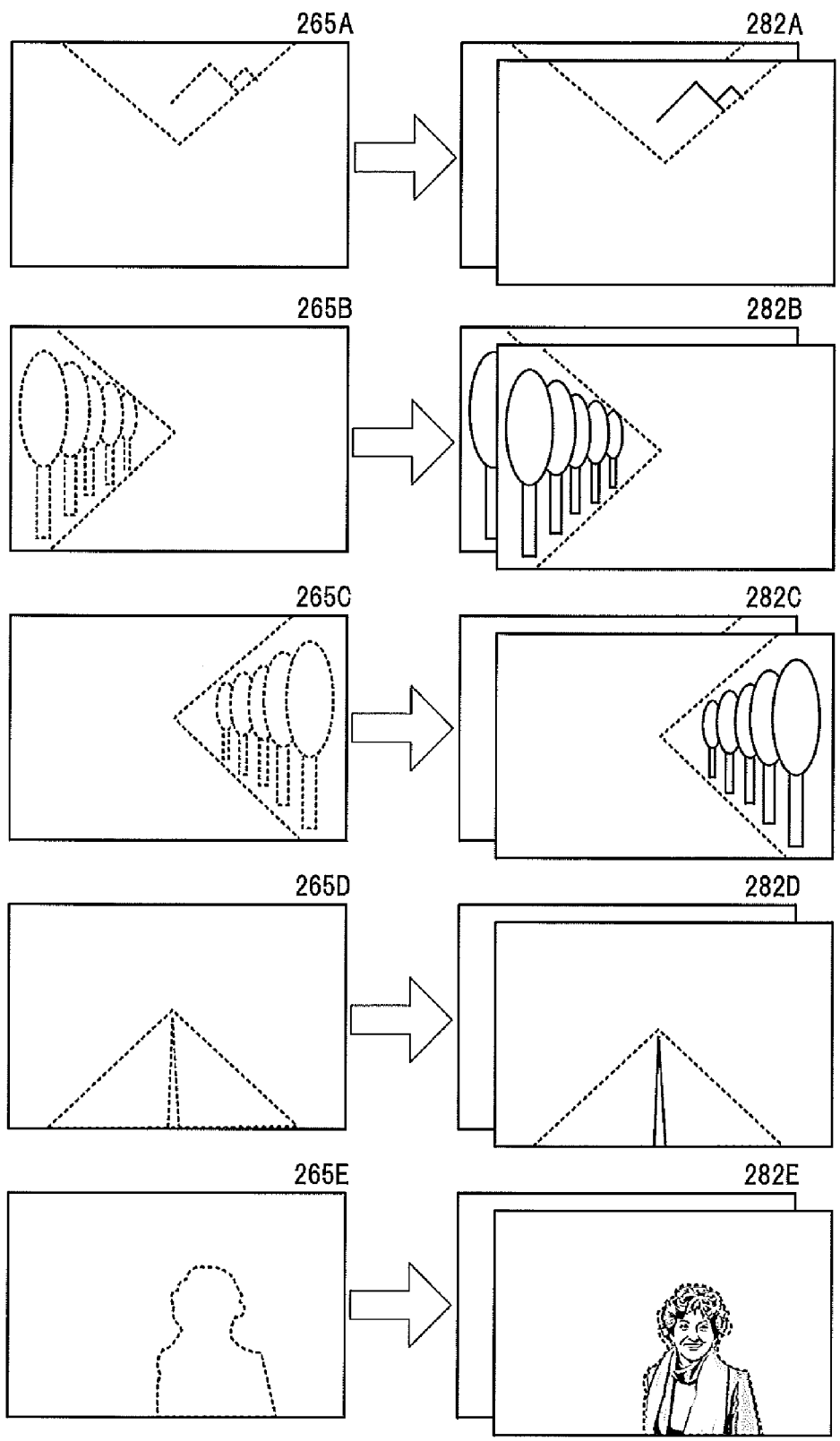
FIG. 13 is a series of diagrams illustrating the procedure for generating individual stereoscopic images in the stereoscopic image generation system.

More specifically, the stereoscopic image generation unit 180 in the present embodiment includes an individual image generation unit 182 and a stereoscopic image combining unit 184. As shown in FIG. 13, the individual image generation unit 182 generates, on the basis of the individual depth maps 265A to 265E, individual stereoscopic images 282A to 282E (including individual right-eye images and individual left-eye images) in which the positions of pixels 204 in the corrected individual original images 203A to 203E have been changed. The individual stereoscopic images 282A to 282E are generated for all the original images 200 (all the frames in the moving image) while the operator checks the quality of each of the finished individual stereoscopic images 282A to 282E for the regions 202A to 202E.

More specifically, the individual stereoscopic images 282A to 282E are generated using the pieces of depth information 270 in the individual depth maps 265A to 265E such that the amounts of horizontal displacements (shifts) of pixels 204 for areas located on the deep side in the corrected individual original images 203A to 203E are small and the amounts of horizontal displacements of pixels 204 for areas located on the front side are large. This procedure allows each of the individual stereoscopic images 282A to 282E to have parallax.

Figure 14:
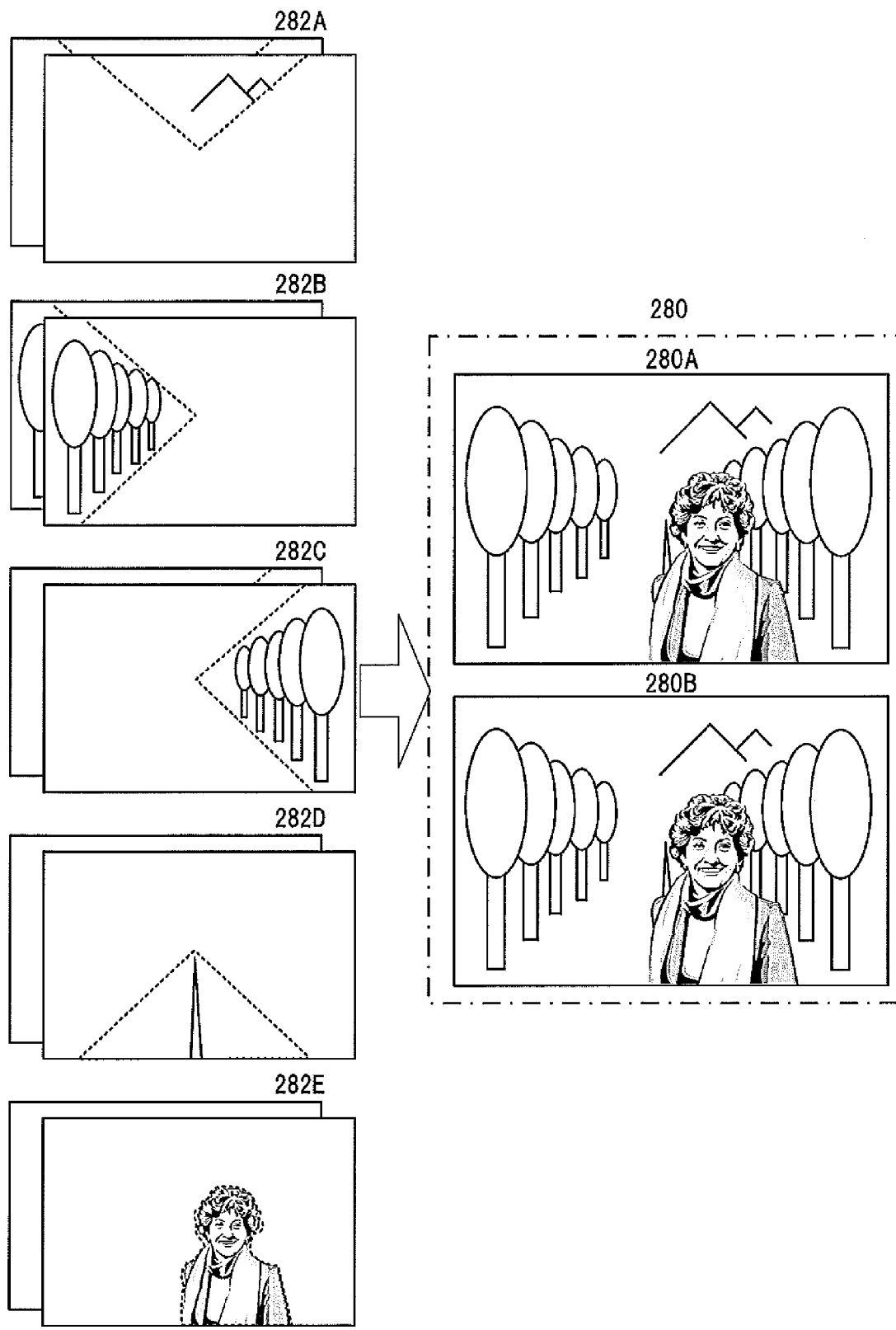
FIG. 14 is a diagram illustrating the procedure for generating a stereoscopic image in the stereoscopic image generation system.

Then as shown in FIG. 14, the stereoscopic image combining unit 184 combines these individual stereoscopic images 282A to 282E to generate a stereoscopic image 280 (including a right-eye image 280A and a left-eye image 280B). In this combining procedure, the right-eye images in the individual stereoscopic images 282A to 282E are combined to generate the right-eye image 280A, and the left-eye images in the individual stereoscopic images 282A to 282E are combined to generate the left-eye image 280B.

Figure 15:
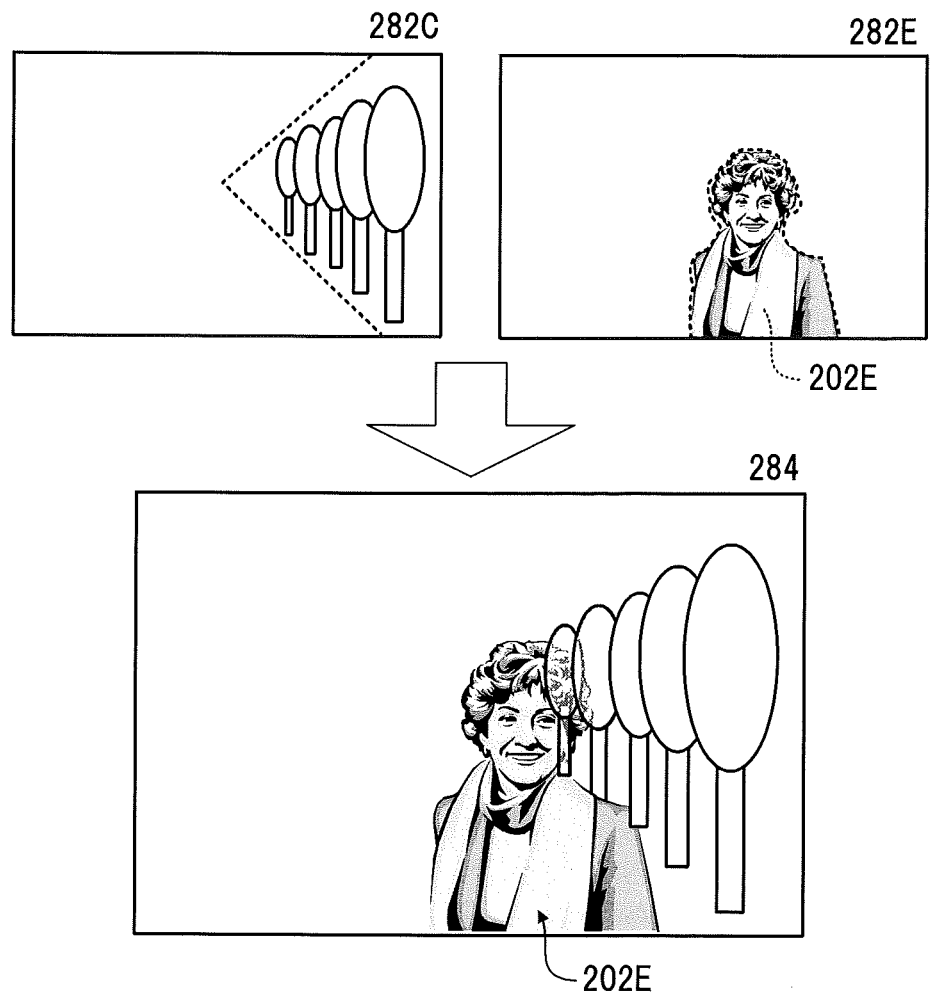
FIG. 15 is a diagram illustrating a method of combining stereoscopic images in the stereoscopic image generation system.

In the present embodiment, the stereoscopic image combining unit 184 combines the plurality of individual stereoscopic images 282A to 282E on the basis of the front-rear relationships therebetween, such that any rear image of the individual stereoscopic images 282A to 282E appears through any front image of the individual stereoscopic images 282A to 282E. For example, as shown exaggerated in FIG. 15, when the third individual stereoscopic image 282C and the fifth individual stereoscopic image 282E are combined together, transparent compositing (e.g., alpha channel compositing) is used. In this manner, the tree line in the third individual stereoscopic image 282C that is located on the rear side and originally hidden is visible through the woman in the fifth individual stereoscopic image 284. In FIG. 15, for convenience of the description, the entire part of the tree line (subject) on the rear side appears through the woman. However, the transparent compositing processing causes the peripheral outline of the tree line that appears as part of the region 202E in the fifth individual stereoscopic image 282E on the front side to be emphasized.

In this manner, the combined stereoscopic image 280 is generated such that the stereoscopic effect of the fifth individual stereoscopic image 282E on the front side and the stereoscopic effect of the third individual stereoscopic image 282C on the rear side are superposed near the boundary therebetween and remain unchanged. Therefore, the occurrence of depth discontinuity and gaps is automatically suppressed at the boundary between subjects spaced apart in the front-rear direction.

In the stereoscopic image 280 generated through the above steps, the viewer of the image views the right-eye image 280A with the right eye and the left-eye image 280B with the left eye, so that the parallax between these images is processed in the brain of the viewer to allow the viewer to perceive a stereoscopic effect.

Figure 16:
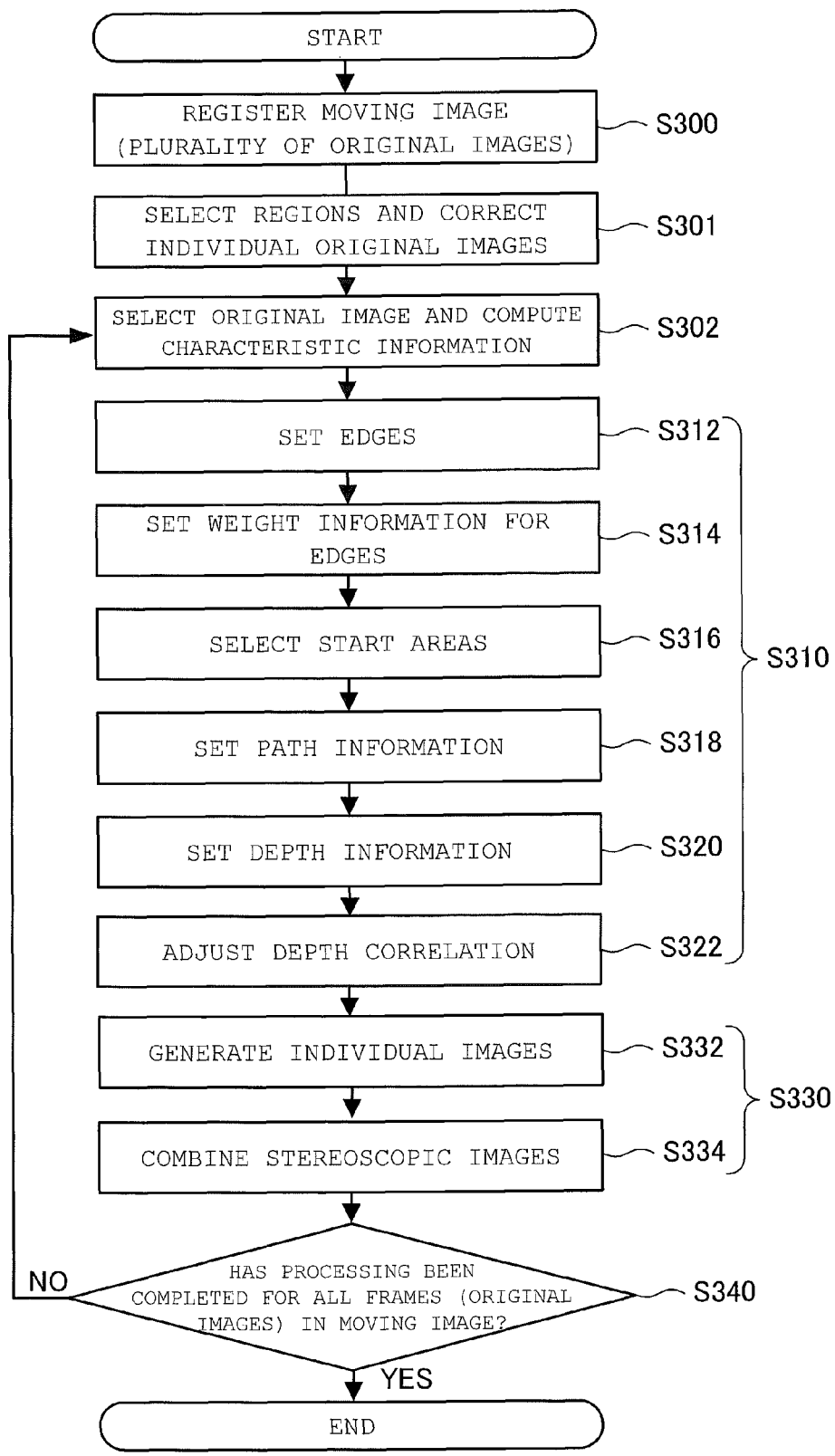
FIG. 16 is a flowchart showing the procedure for generating a stereoscopic image in the stereoscopic image generation system.

Next, referring to FIG. 16, the procedure for generating a stereoscopic image using the stereoscopic image generation system 1 will be described.

First, in step 300, a moving image composed of a plurality of original images (frames) 200 is registered in the third storage medium 18 through the input-output interface 24 of the stereoscopic image generation system 1. Next, in step 301, a plurality of regions 202 are set in each of the original images 200, and color values in overlapping areas X in individual original images 201 generated for the regions 202 are corrected to acquire corrected individual original images 203 (a region setting step). Then in step 302, the characteristic information acquisition unit 140 extracts a first original image (frame) 200 from the moving image and acquires the characteristic information 240 for each of the pixels 204 in the corrected individual original images 203 constituting the first original image 200 (a characteristic information acquisition step).

Next, in step 310, a depth map 265 in which depth information 270 is set for each of the pixels 204 on the basis of the pieces of characteristic information 240 is generated (a depth information generation step). Specifically, the depth information generation step 310 is composed of steps 312 to 320.

First in step 312, an edge 262 is set for each of pairs of adjacent pixels 204 (an edge setting step). Then in step 314, weight information 264 is set for each edge 262 on the basis of the pieces of characteristic information 240 that have been set for all the pixels 204 (a weight information setting step). Next, in step 316, start areas 266 are selected from the pixels 204 in the corrected individual original images 203 (a start area selection step). Then the process proceeds to step 318. In step 318, a shortest path is computed for each pixel 204 such that the cumulative sum of the pieces of weight information 264 computed along the path from a corresponding one of the start areas 266 to the each pixel 204 is minimized, and the pieces of shortest-path information 268 computed along the shortest paths for all the pixels 204 as the minimum cumulative sums of the pieces of weight information 264 are set for all the pixels 204 (a path information setting step). Then in step 320, depth information 270 is set for each of the pixels 204 using the pieces of shortest-path information 268, and the pieces of depth information 270 are grouped to generate individual depth maps 265 for the grouped pixels (a depth determination step). Finally, in step 322, the pieces of depth information 270 in the individual depth maps 265 generated individually for the regions 202 are adjusted on the basis of the relative front-rear relationships between the plurality of regions (a depth correlation adjusting step).

After completion of the depth information generation step 310, the process proceeds to step 330, and a stereoscopic image composed of a right-eye image 280A and a left-eye image 280B in which the positions of the pixels 204 are shifted on the basis of the determined pieces of depth information 270 (the depth map 260) is generated (a stereoscopic image generation step). Specifically, the stereoscopic image generation step 330 includes an individual image generation step 332 and a stereoscopic image combining step 334. In the individual image generation step 332, individual stereoscopic images 282 are generated in which the positions of pixels have been changed using the corrected individual original images 203 and the individual depth maps 265 that have been set for the regions 202, respectively. Next, in the stereoscopic image combining step 334, these individual stereoscopic images 282 are combined in a transparent manner to generate a stereoscopic image 280.

In the example shown above, the pieces of depth information 270 are grouped to generate individual depth maps 265, and individual stereoscopic images 282 are generated using these individual depth maps 265. However, the present invention is not limited thereto. The individual stereoscopic images 282 can be generated using the pieces of depth information 270 as they are without generating the depth maps. It is not necessary to postpone the execution of the stereoscopic image generation step 330 until all the pieces of depth information 270 are generated for the corrected individual original images 203. The pieces of depth information 270 for pixels 204 that have been set may be successively used in the stereoscopic image generation step 330 to generate individual stereoscopic images 282 and a stereoscopic image 280 pixel by pixel. Of course, if necessary, it is preferable to form images of or visualize the pieces of depth information 270 as the individual depth maps 265, as shown in the present embodiment. This is convenient when the operator of the stereoscopic image generation system 1 visually checks the status of the set pieces of depth information 270.

After completion of the generation of the stereoscopic image 280 from the original image 200 with the above procedures, the process proceeds to step 340 to determine whether or not the current original image 200 is the last frame in the moving image. If the current original image 200 is not the last frame, the process returns to step 302. Then the next original image (frame) 200 is extracted, and the above steps are repeated. If the original image 200 used to generate the stereoscopic image 280 is the last frame in the moving image, the stereoscopic image generation procedure is ended.

As described above, in the stereoscopic image generation system 1 in the present embodiment, a plurality of regions are set in an original image 200, and pieces of depth information 270 are determined in each of the regions 200. Therefore, the pieces of depth information 270 can be finely set for each region 202, and the stereoscopic effect of the stereoscopic image 280 can be set with high precision. Particularly, in the present embodiment, first, individual stereoscopic images 282 are generated for the regions 202 and are then combined to complete a stereoscopic image 280. In this manner, after the stereoscopic effect is finely adjusted and checked for each of the regions 202A to 202E to improve the quality of the individual stereoscopic images 282A to 282E, the individual stereoscopic images 282A to 282E are combined to generate a final stereoscopic image 280 (including a right-eye image 280A and a left-eye image 280B) without deterioration of the stereoscopic effect of each individual stereoscopic image. Therefore, the stereoscopic image 280 obtained has a reduced uncomfortable feeling. The time required to generate the individual stereoscopic images 282 can be significantly smaller than the time required to generate the entire stereoscopic image 280 at once. Therefore, the operator can work while efficiently checking the stereoscopic effect in each region 202.

Particularly, in the stereoscopic image generation system 1, the pieces of depth information 270 set individually for the plurality of regions 202 are adjusted according to the front-rear relationships between the regions 202. Therefore, the overall stereoscopic effect can be freely adjusted, and the intention of the producer of the original image 200 can be reflected on the stereoscopic effect. For example, in an original image 200, when the depth differences in a region 202 containing a focused subject are set to be large, a stereoscopic effect stronger than the actual stereoscopic effect can be obtained. Small depth differences may be set for a region 202 containing an unfocused subject to reduce a stereoscopic effect. Similarly, depth information can be adjusted by placing a region 202 to be emphasized at a position on the front side of the actual position and placing a region 202 not to be emphasized at a position on the rear side of the actual position.

In the stereoscopic image generation system 1, individual stereoscopic images 282 are combined such that, in an overlapping area in which a plurality of regions 202 overlap each other, a rear-side individual stereoscopic image 282 appears through a front-side individual stereoscopic image 282. In this manner, since the stereoscopic effects are superposed, a natural sense of depth can be obtained such that as if a part of the rear-side subject extends into the rear side of the front-side subject. Particularly, in an overlapping area in which a front-side region 202 and a rear-side region 202 overlap each other, the color values of pixels 204 on the rear side that are originally hidden can be estimated. Therefore, multiple color values that differ in a depth direction can be assigned to a single pixel 204. Since different stereoscopic effects can be given to the multiple color values in a transparent manner, the extension effect described above can thereby be more emphasized.

In the present embodiment, the pieces of depth information 270 that serve as the basis of the stereoscopic effect in the generated stereoscopic image 280 are generated using the pieces of shortest-path information 268 computed from the cumulative sums of the pieces of weight information 264 along the shortest paths between a plurality of pixels 204. Therefore, the pieces of depth information 270 for sets of pixels 204 connected through edges 262 can have continuity. A natural sense of depth can thereby imparted to the stereoscopic image 280 generated using the pieces of depth information 270. Particularly, the discontinuous phenomenon that occurs in a conventional stereoscopic image due to steep changes in depth information at the boundaries between a human on the front side and a background on the deeper side can be suppressed, so that a stereoscopic effect that allows the viewer to have a reduced uncomfortable feeling can be imparted to the stereoscopic image 280. In addition, the suppression of the discontinuous phenomenon allows suppression of the occurrence of gaps in the generated stereoscopic image 280. Therefore, the amount of image correction (blurring and image deformation) for correcting the gaps is reduced, and deterioration of the image quality is thereby reduced.

In the stereoscopic image generation system 1, the start areas 266 are selected from the pixels in the areas 209A for the deepest parts in the original image 200 (the corrected individual original images 203) or from the pixels in the areas 209B for the frontmost parts. The start areas 266 are used as the reference points (zero points) when the pieces of shortest-path information 268 for other pixels 204 are computed. The selection of the start areas 266 from pixels 204 in the deepest or frontmost parts allows pieces of depth information 270 to be generated without an uncomfortable feeling. The selection of the start areas 266 may be performed by displaying the original image 200 on the display unit (display) 22 to prompt the operator of the stereoscopic image generation system 1 to select, as the start areas 266, pixels in parts that are assumed by the operator to be the deepest or frontmost parts. Alternatively, the stereoscopic image generation system 1 may analyze the original image 200 to estimate the areas 209A for the deepest parts or the areas 209B for the frontmost parts so that the start areas 266 are automatically selected from the pixels in the areas 209A or 209B.

With this method, almost all the pieces of depth information 270 can be computed automatically, and the processing load on the operator of the stereoscopic image generation system 1 can thereby be reduced significantly. In a conventional system, a complicated operation must be performed. More specifically, while a stereoscopic image is checked, the pieces of depth information 270 are corrected.

In the present embodiment, a plurality of start areas 266 used as reference values for the computation of a sense of depth are selected individually for the regions 202, respectively. The use of a combination of any of these start areas allows the pieces of depth information 270 to be determined for the regions 202 in a more flexible manner. More specifically, since optimal start areas 266 can be selected for the regions 202 in consideration of the scene of the original image 200 and the subjects contained in the regions 202, a more natural stereoscopic effect can be obtained.

In the example shown in the present embodiment, single pixels are selected as the start areas 266 in the start area selection step 316, but the present invention is not limited thereto. For example, as exemplified in FIG. 7, a plurality of pixels 204 contained in the predetermined area 209C in the original image 200 may be selected as a single start area 266. This means that, when the shortest path technique is used, the pieces of shortest-path information and the pieces of weight information for the edges between all the pixels 204 contained in the area 209C are pre-set to zero or a fixed value (reference value). In this manner, even when this area contains video noise, the influence of the noise can be cut out. In addition, the computation for a region, such as a region for a fleckless blue sky, to which different senses of depth are not required to be given can be omitted, and therefore the time required for image processing for computing shortest paths can be significantly reduced. The present invention is not limited to the case in which a predetermined specified area is used as a start area 266. Pixels other than a start area can be grouped, and the grouped pixel region can be used. For example, such pixel grouping to set a region is preferable for a simple subject in which common depth information can be used for a plurality of adjacent pixels in the region having a certain area. In this case, the operator instructs the system to treat the pixels in the grouped region as one virtual pixel. In this manner, the time required for image processing for computing the shortest paths can be significantly reduced.

Figure 17:
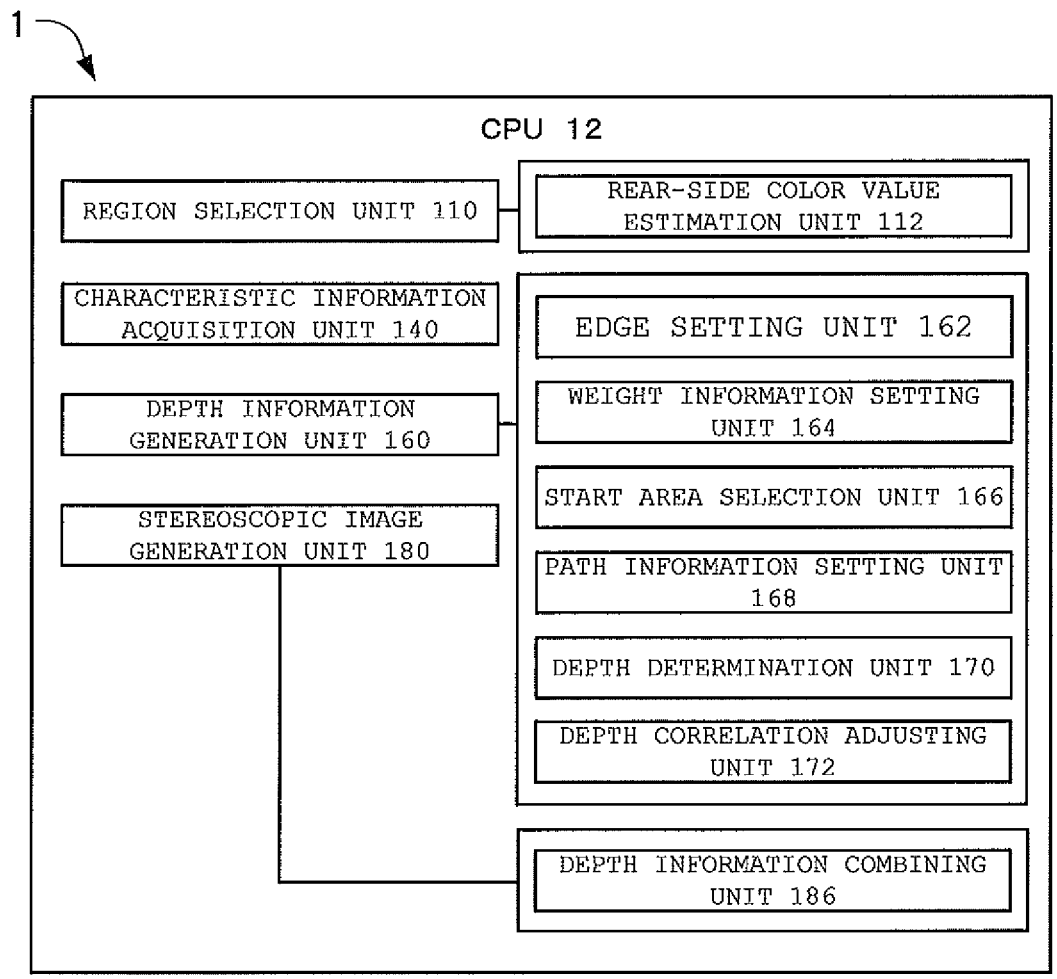
FIG. 17 is a block diagram illustrating the functional configuration of another example of the stereoscopic image generation system.
Figure 18:
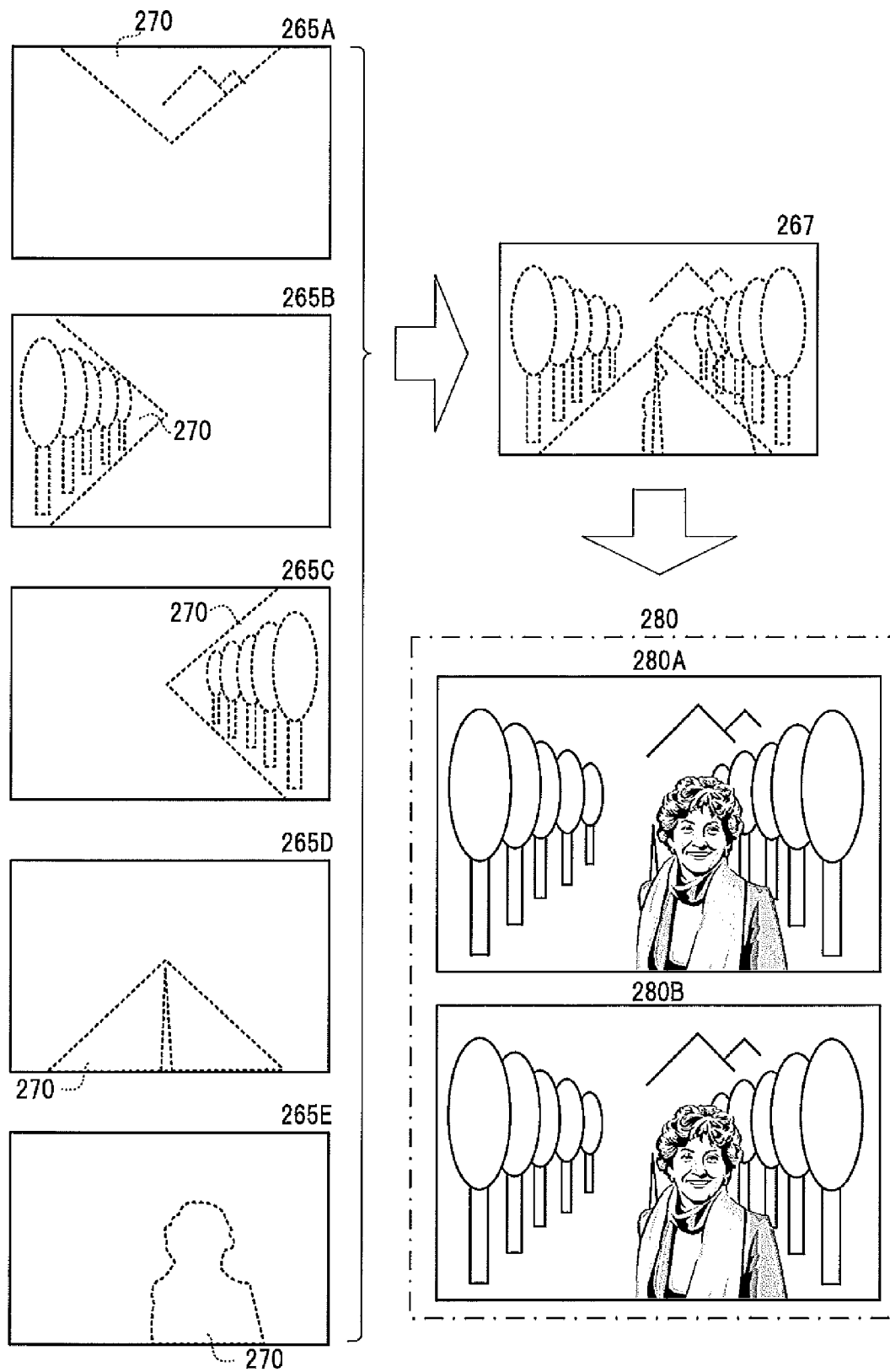
FIG. 18 is a block diagram illustrating the flow of generating a stereoscopic image in the another example of the stereoscopic image generation system.

In the example described in the present embodiment, individual stereoscopic images 282 are generated using the individual depth maps 265 in the stereoscopic image generation step 330, and the individual stereoscopic images 282 are combined in a transparent manner to generate a stereoscopic image 280. However, the present invention is not limited thereto. For example, preferably, the stereoscopic image generation unit 180 may include a depth information combining unit 186 instead of the individual image generation unit 182 and the stereoscopic image combining unit 184, as shown in FIGS. 17 and 18. The depth information combining unit 186 combines the plurality of individual depth maps 265A to 265E generated for the regions 202A to 202E by the depth information generation unit 160 to generate a single set of pieces of depth information (one combined depth map 267). Therefore, the operator can visually check the overall stereoscopic effect using the combined depth map 267. The stereoscopic image generation unit 180 generates the right-eye image 280A and the left-eye image 280B using the combined depth map 267. When the operator need not use the combined depth map 267, the depth information combining unit 186 may not be used. More specifically, when the pieces of depth information 270 of the pixels 240 that have been set for each of the regions 202A to 202E by the depth information generation unit 160 are used in the stereoscopic image generation unit 180, a stereoscopic image 280 can be generated.

In the example described in the present embodiment, the start areas 266A to 266E are selected from pixels 204 in the selected regions 202A to 202E, but the present invention is not limited thereto.

Figure 19:
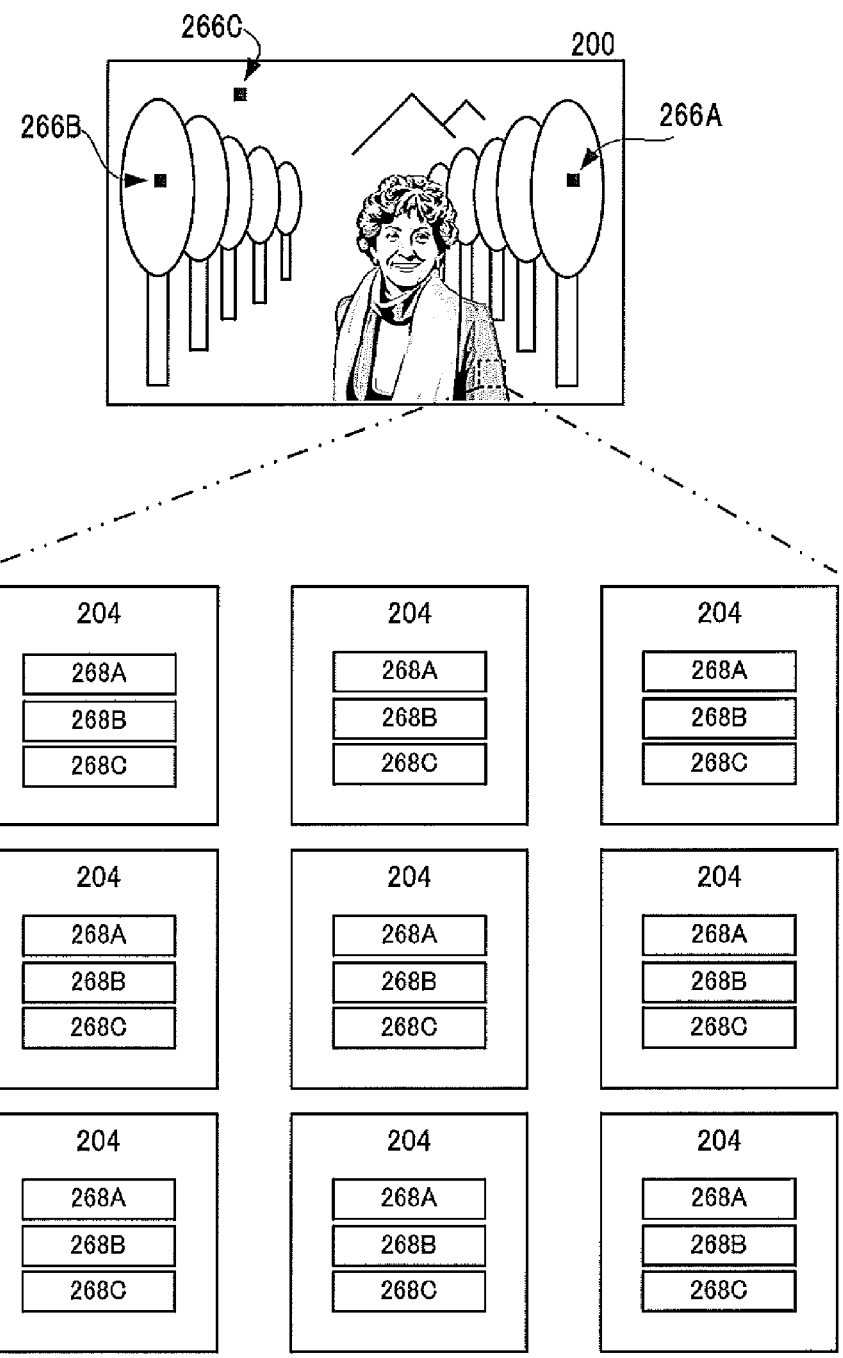
FIG. 19 is a block diagram illustrating the flow of generating a stereoscopic image in still another example of the stereoscopic image generation system.

For example, as shown in FIG. 19, the start area selection unit 166 may select a plurality of start areas 266A to 266C from the pixels in the original image 200 irrespective of the regions 202 in the original image 200, and the path information setting unit 168 may compute the shortest paths from the start areas 266A to 266C to all the pixels 204 in the original image 200 and set a plurality of pieces of shortest-path information 268A to 268C for each of the pixels.

For each of the regions 202, the depth determination unit 170 selects one from the plurality of pieces of shortest-path information 268A to 268C set for each of the pixels 204 to determine the depth information 270. In this case, the depth determination unit 170 may determine the depth information 270 using the plurality of pieces of shortest-path information 268A to 268C set for each of the pixels 204. Preferably, the determination as to whether one piece of shortest-path information is selected from the plurality of pieces of shortest-path information 268A to 268C or the plurality of pieces of shortest-path information 268A to 268C are used is made common to the regions 202.

Figure 20:
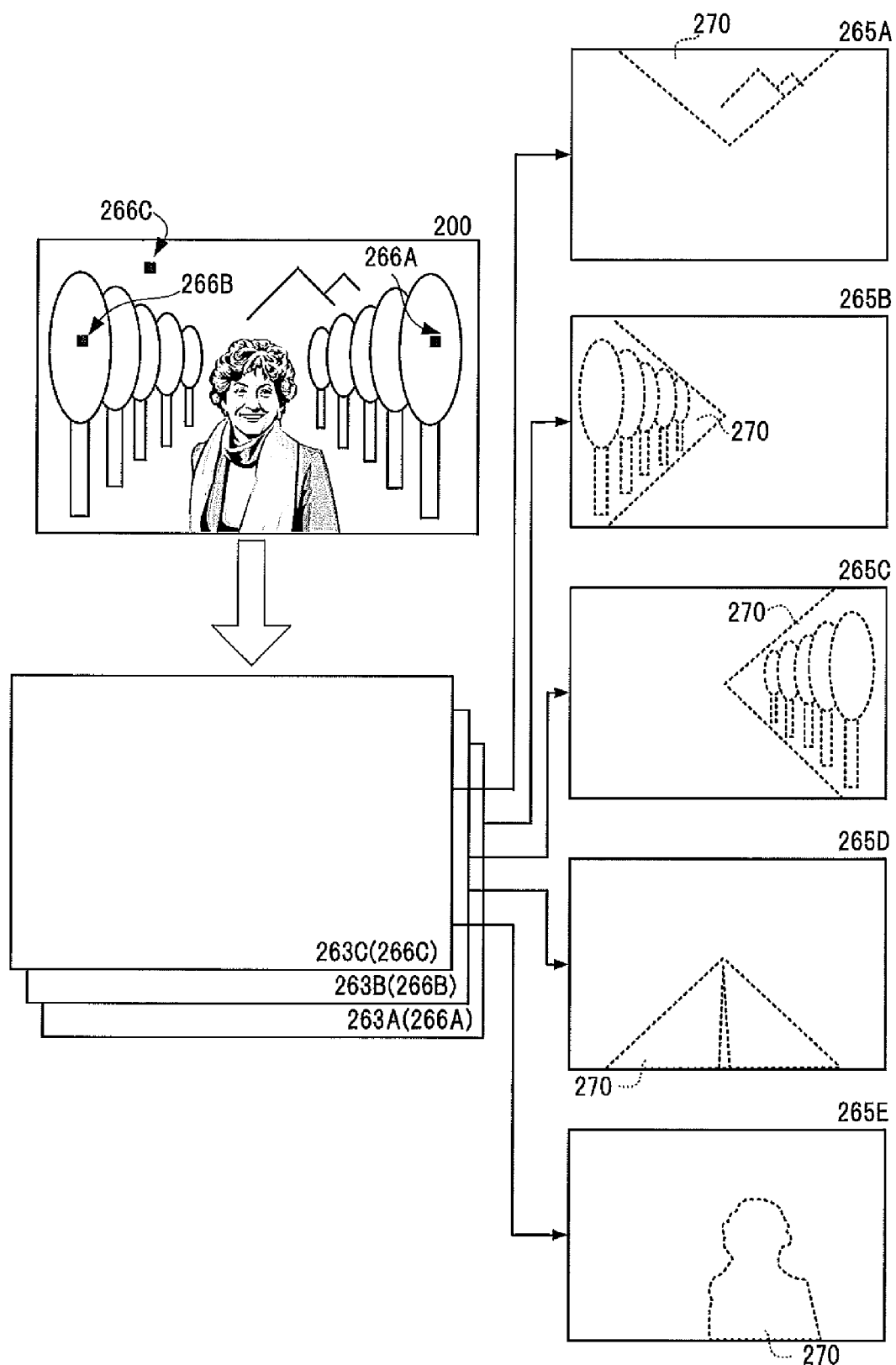
FIG. 20 is a block diagram illustrating the flow of generating the stereoscopic image in the still another example of the stereoscopic image generation system.

Referring to FIG. 20, this method will be described from a different point of view. The depth information generation unit 160 generates a plurality of temporary depth maps 263A to 263C for the start areas 266A to 266C. Then the depth determination unit 170 determines whether one of the plurality of temporary depth maps 263A to 263C generated for the start areas 266A to 266C is used or two or more of them are used in a superposed manner. In this case, when the determination is made for each of the plurality of regions 202A to 202E selected from the original image 200, individual depth maps 265A to 265E for the regions 202A to 202E are generated.

In this manner, the choices when the pieces of depth information 270 are determined can be increased. These choices mean the start areas 266A to 266C. When the start areas 266A to 266C are selected from the pixels in a large area including the regions outside the regions 202A to 202E, more preferable start areas 266 can be selected. In the example shown above, three start areas are selected. The larger the number of start areas 266, the more flexibly the pieces of depth information 270 can be determined.

As described above, it is also preferable that a plurality of pieces of shortest-path information be selected from the pieces of shortest-path information 268A to 268C (the temporary depth maps 263A to 263C) and the pieces of depth information 270 be determined using the selected pieces of shortest-path information.

In this manner, even when one of the pieces of shortest-path information 268A to 268C (the temporary depth maps 263A to 263C) contains errors that cause incorrect depth information, if the rest of the pieces of shortest-path information 268A to 268C (the temporary depth maps 263A to 263C) can give correct depth information, the combined use of these information values can correct the errors automatically. Therefore, more smooth depth information 270 with the noises being cancelled out can be obtained. When the plurality of pieces of shortest-path information 268A to 268C are used to determine the pieces of depth information 270, any of various computation methods such as the sum or average of these values can be used.

In the examples shown in the present embodiment, a shortest path that gives the minimum value of the sum of the pieces of weight information 264 along the path from a start area 266 to each pixel 204 is computed in the path information setting step 318, but the present invention is not limited thereto. For example, the Prim's algorithm may be used to determine, from paths composed of partial groups of sides for all the pixels, a path in which the sum of the weights in the groups of sides is smallest. More specifically, in the present invention, any algorithm can be used so long as certain weight values can be specified using various paths between the pixels.

The examples shown in the above embodiment are limited to the case in which a binocular parallax stereoscopic image including a right-eye image and a left-eye image is generated, but the present invention is not limited thereto. For example, a multi-view stereoscopic image may be generated using the depth information, and a multi-view parallax stereoscopic image can also be generated. More specifically, in the present invention, any type of stereoscopic images that use pieces of depth information can be generated.

The stereoscopic image generation method and stereoscopic image generation system of the present invention are applicable to, in addition to the field of production of movie, TV program, etc., the field of various devices, such as television sets and game machines, on which stereoscopic images converted from normal images are displayed.

The entire disclosure of Japanese Patent Application No. 2011-94711 filed on Apr. 21, 2011 including specification, claims, drawings, and summary are incorporated herein by reference in its entirety.

What is claimed is:

1. A stereoscopic image generation method comprising: a region setting step of setting a plurality of regions in an original image;
   a characteristic information acquisition step of acquiring characteristic information for each of pixels constituting the original image;
   a depth information generation step of generating depth information for each of the pixels on the basis of the characteristic information by determining the depth information independently for each of the plurality of the regions and generating an individual depth map for each of the plurality of regions;
   and a stereoscopic image generation step of generating a stereoscopic image in which positions of the pixels are changed based on the determined depth information and the individual depth map for each of the plurality
   wherein the region setting step includes a rear-side color value estimation step of estimating, in an overlapping area in which a front one of the regions and a rear one of the regions overlap each other, a color value of a pixel in the rear one of the regions and generating, for each of the plurality of regions, a corrected individual original image in which the missing color value in the overlapping area is corrected; and
   in depth information generation step, the depth information is generated for each of the pixels in each of the corrected individual original images.

2. The stereoscopic image generation method according to claim 1, wherein in the region setting step, the regions are set corresponding to subjects contained in the original image.

3. The stereoscopic image generation method according to claim 1, wherein the stereoscopic image generation step includes
   an individual stereoscopic image generation step of generating, for each of the plurality of regions, an individual stereoscopic image in which the positions of pixels are changed and;
   a stereoscopic image combining step of combining the plurality of individual stereoscopic images generated for the plurality of regions to generate the stereoscopic image.

4. The stereoscopic image generation method according to claim 3, wherein in the stereoscopic image combining step, the plurality of individual stereoscopic images are combined on the basis of front-rear relationships between the plurality of individual stereoscopic images such that any rear individual stereoscopic image of the plurality of individual stereoscopic images appears through any front individual stereoscopic image of the plurality of individual stereoscopic images.

5. The stereoscopic image generation method according to claim 1, wherein the stereoscopic image combining step includes a depth information combining step of combining the pieces of depth information generated for the plurality of regions, and
   the stereoscopic image is generated using the combined pieces of depth information.

6. The stereoscopic image generation method according to claim 3, wherein the region setting step includes a rear-side color value estimation step of estimating, in an overlapping area in which a front one of the regions and a rear one of the regions overlap each other, a color value of a pixel in the rear one of the regions and generating, for each of the plurality of regions, a corrected individual original image in which the missing color value in the overlapping area is corrected; and in the depth information generation step, the depth information is generated for each of the pixels in each of the corrected individual original images.

7. The stereoscopic image generation method according to claim 5, wherein the region setting step includes a rear-side color value estimation step of estimating, in an overlapping area in which a front one of the regions and a rear one of the regions overlap each other, a color value of a pixel in the rear one of the regions and generating, for each of the plurality of regions, a corrected individual original image in which the missing color value in the overlapping area is corrected; and in the depth information generation step, the depth information is generated for each of the pixels in each of the corrected individual original images.

8. The stereoscopic image generation method according to claim 1, wherein the depth information generation step includes a depth correlation adjusting step of adjusting the pieces of depth information generated for each of the regions on the basis of relative front-rear relationships between the plurality of regions.

9. The stereoscopic image generation method according to claim 3, wherein the depth information generation step includes a depth correlation adjusting step of adjusting the pieces of depth information generated for each of the regions on the basis of relative front-rear relationships between the plurality of regions.

10. The stereoscopic image generation method according to claim 5, wherein the depth information generation step includes a depth correlation adjusting step of adjusting the pieces of depth information generated for each of the regions on the basis of relative front-rear relationships between the plurality of regions.

11. The stereoscopic image generation method according to claim 1, wherein the depth information generation step includes
    an edge setting step of setting an edge for each of pairs of pixels extracted from the original image,
    a weight information setting step of setting weight information for each of the edges on the basis of the characteristic information,
    a start area selection step of selecting a start area from the pixels,
    a path information setting step of computing a path with regard to the weight information from the start area to each of the pixels and setting path information for each of the pixels, and
    a depth determination step of setting depth information for each of the pixels on the basis of the path information for the pixel.

12. The stereoscopic image generation method according to claim 11, wherein in the start area selection step, a pixel contained in an area for a deepest part in each of the plurality of regions or a pixel contained in an area for a frontmost part in the each of the plurality of regions is selected as the start area.

13. The stereoscopic image generation method according to claim 11, wherein in the start area selection step, a plurality of start areas are selected.

14. A stereoscopic image generation system constituted by a computer, the system comprising: a region setting step of setting a plurality of regions in an original image;
    characteristic information acquisition unit for acquiring characteristic information for each of pixels constituting the original image;
    a depth information generation unit for generating depth information for each of the pixels on the basis of the characteristic information by determining the depth information independently for each of the plurality of the regions and generating an individual depth map for each of the plurality of regions;
    stereoscopic image generation unit for generating a stereoscopic image in which positions of the respective pixels are changed on the basis of the pieces of determined depth information and the individual depth map,
    wherein the region setting unit includes a rear-side color value estimation for estimating, in an overlapping area in which a front one of the regions and a rear one of the regions overlap each other, a color value of a pixel in the rear one of the regions and generating, for each of the plurality of regions, a corrected individual original image in which the missing color value in the overlapping area is corrected;
    in depth information generation step, the depth information is generated for each of the pixels in each of the corrected individual original images.

* * * * *